US012694494B2

(12) United States Patent
Zhou et al.

(10) Patent No.: US 12,694,494 B2
(45) Date of Patent: Jul. 28, 2026

(54) METHOD AND SYSTEM FOR GEOMETRIC CORRECTION BASED ON IMAGE TRACKING

(71) Applicant: SHANGHAI UNITED IMAGING HEALTHCARE CO., LTD., Shanghai (CN)

(72) Inventors: Haihua Zhou, Shanghai (CN); Kai Cui, Shanghai (CN); Jing Yan, Shanghai (CN); Jian Zhong, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 383 days.

(21) Appl. No.: 18/463,243

(22) Filed: Sep. 7, 2023

(65) Prior Publication Data

US 2024/0078647 A1 Mar. 7, 2024

(30) Foreign Application Priority Data

Sep. 7, 2022 (CN) .......................... 202211089554.4

(51) Int. Cl.
*G06T 5/80* (2024.01)
*G06T 5/50* (2006.01)
(Continued)

(52) U.S. Cl.
CPC .................. *G06T 5/80* (2024.01); *G06T 5/50* (2013.01); *G06T 7/248* (2017.01); *G06T 7/97* (2017.01)

(58) Field of Classification Search
None
See application file for complete search history.

(56) References Cited

U.S. PATENT DOCUMENTS 11,457,883 B1 * 10/2022 Hartley .................. A61B 6/032
2004/0264648 A1 12/2004 Claus et al.
(Continued)

FOREIGN PATENT DOCUMENTS

CN 105869130 A 8/2016
CN 110766629 A 2/2020
(Continued)

OTHER PUBLICATIONS

Li, Xinhua et al., A generic geometric calibration method for tomographic imaging systems with flat-panel detectors—A detailed implementation guide, Medical Physics, 37(7): 3844-3854, 2010.
(Continued)

*Primary Examiner* — Gabriel I Garcia
(74) *Attorney, Agent, or Firm* — METIS IP LLC

(57) ABSTRACT

Method and system for geometric correction based on image tracking, the method including: obtaining a plurality of projection images of a geometric model, each of the projection images including a projection marker corresponding to an original marker in the geometric model; obtaining an initial correspondence between the original markers in the geometric model and the projection markers in one of the projection images; determining a target correspondence between the original markers in the geometric model and the projection markers in the tracked projection image by tracking, based on a correlation of the projection images and the initial correspondence, the projection markers in the projection images; performing, based on the target correspondence, a geometric correction.

20 Claims, 9 Drawing Sheets

(51) Int. Cl.
    *G06T 7/00*          (2017.01)
    *G06T 7/246*       (2017.01)

(56)             References Cited

U.S. PATENT DOCUMENTS

| | | | |
|---|---|---|---|
| 2013/0308105 A1 * | 11/2013 | Kubota | ................... G02B 15/20 |
| | | | 359/683 |
| 2024/0046490 A1 * | 2/2024 | Lang | .................... A61B 90/361 |

FOREIGN PATENT DOCUMENTS

| | | |
|---|---|---|
| CN | 111544020 A | 8/2020 |
| CN | 111553849 A | 8/2020 |
| CN | 111588467 A | 8/2020 |

OTHER PUBLICATIONS

David A. Scaduto et al., Determination of System Geometrical Parameters and Consistency between Scans for Contrast-Enhanced Digital Breast Tomosynthesis, Springer, 24-31, 2012.

* cited by examiner

100

<u>300</u>

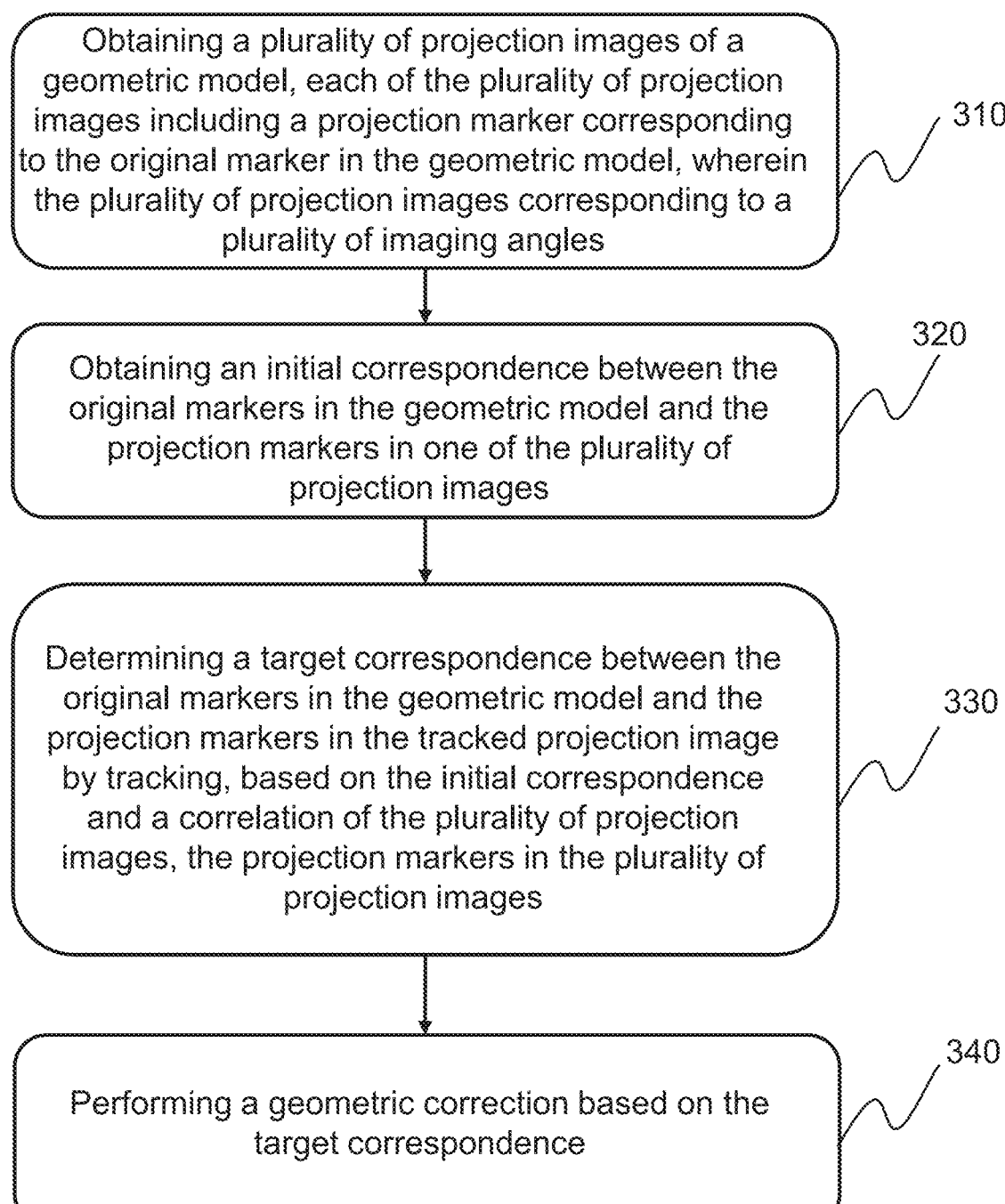

Obtaining a plurality of projection images of a geometric model, each of the plurality of projection images including a projection marker corresponding to the original marker in the geometric model, wherein the plurality of projection images corresponding to a plurality of imaging angles — 310

Obtaining an initial correspondence between the original markers in the geometric model and the projection markers in one of the plurality of projection images — 320

Determining a target correspondence between the original markers in the geometric model and the projection markers in the tracked projection image by tracking, based on the initial correspondence and a correlation of the plurality of projection images, the projection markers in the plurality of projection images — 330

Performing a geometric correction based on the target correspondence — 340

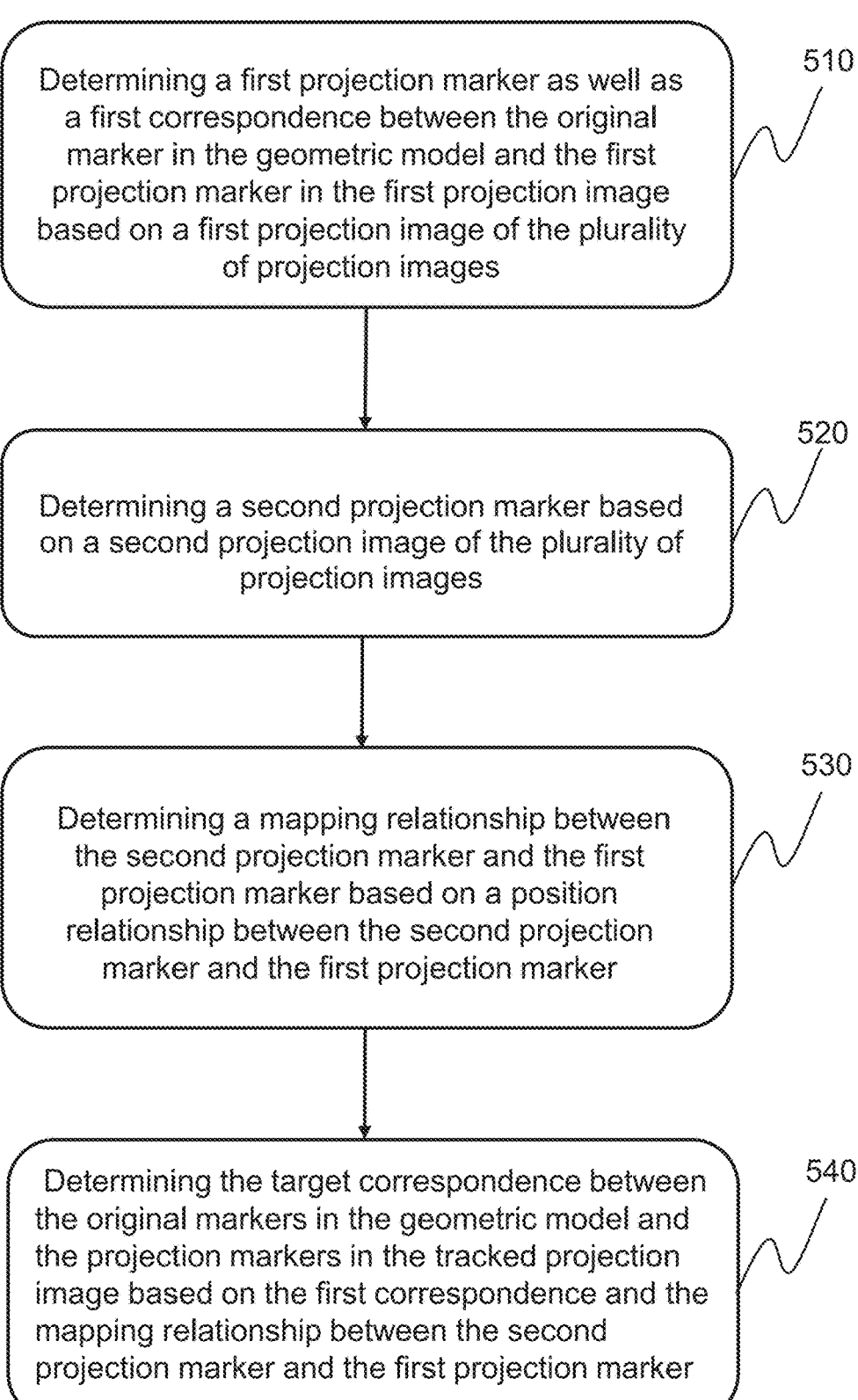

510

Determining a first projection marker as well as a first correspondence between the original marker in the geometric model and the first projection marker in the first projection image based on a first projection image of the plurality of projection images

520

Determining a second projection marker based on a second projection image of the plurality of projection images

530

Determining a mapping relationship between the second projection marker and the first projection marker based on a position relationship between the second projection marker and the first projection marker

540

Determining the target correspondence between the original markers in the geometric model and the projection markers in the tracked projection image based on the first correspondence and the mapping relationship between the second projection marker and the first projection marker

METHOD AND SYSTEM FOR GEOMETRIC CORRECTION BASED ON IMAGE TRACKING

CROSS-REFERENCE TO RELATED APPLICATIONS

This application claims priority of Chinese Patent Application No. 202211089554.4, filed on Sep. 7, 2022, the entire contents of which are incorporated herein by reference.

TECHNICAL FIELD

The present disclosure relates to the field of medical technology, and in particular, to a method and system for geometric correction based on image tracking.

BACKGROUND

A geometric correction is one of mandatory corrections for image reconstruction, which requires a specialized geometric model for geometric correction. By imaging the geometric model at a plurality of rotation angles, actual spatial coordinates of pixels detected by a detector are determined. An important operation in the determination of the geometric correction is to determine a correspondence between model coordinates of a marker in the geometric model and coordinates of projected pixels of the marker in the projected image. Therefore, it is desirable to provide a method and system for efficiently and accurately determining the correspondence, thereby achieving efficient and accurate geometric correction.

SUMMARY

When executing the set of instructions, the at least one processor is directed to perform operations including: obtaining a plurality of projection images of a geometric model, each of the plurality of projection images including a projection marker corresponding to an original marker in the geometric model, wherein one of the plurality of projection images corresponding to one of the plurality of imaging angles; obtaining an initial correspondence between the original markers in the geometric model and the projection markers in one of the plurality of projection images; determining a target correspondence between the original markers in the geometric model and the projection markers in a tracked projection image by tracking, based on a correlation of the plurality of projection images and the initial correspondence, the projection markers in the plurality of projection images; and performing, based on the target correspondence, a geometric correction.

One of the embodiments of the present disclosure provides a method for geometric correction based on image tracking implemented on a device including one or more processing devices and one or more storage devices, the method including: obtaining a plurality of projection images of a geometric model, each of the plurality of projection images including a projection marker corresponding to an original marker in the geometric model, wherein one of the plurality of projection images corresponding to one of the plurality of imaging angles; obtaining an initial correspondence between the original markers in the geometric model and the projection markers in one of the plurality of projection images; determining a target correspondence between the original markers in the geometric model and the projection markers in a tracked projection image by tracking, based on the initial correspondence and a correlation of the plurality of projection images, the projection markers in the plurality of projection images; and performing, based on the target correspondence, a geometric correction.

In the prior art, a geometric model is usually manually positioned, and a method of separately detecting and determining a correspondence between a marker and a projection of each positioning angle is usually used, which has high requirement for the accuracy of model positioning and is not efficient.

Embodiments of the present disclosure propose a method of automatically selecting a projection image of specific angle and utilizing the correlation between adjacently scanned projection images to track the marker for a calculation purposes. The method does not require the placing angle to be very precise, thereby greatly reducing the difficulty of placement of the geometrical correction, and improving the efficiency of the correction.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 3 is a flowchart illustrating an exemplary process for geometric correction based on image tracking according to some embodiments of the present disclosure;

FIG. 5 is a flowchart illustrating an exemplary process of tracking a projection marker based on correlations between projection images according to some embodiments of the present disclosure;

DETAILED DESCRIPTION

Figure 1:
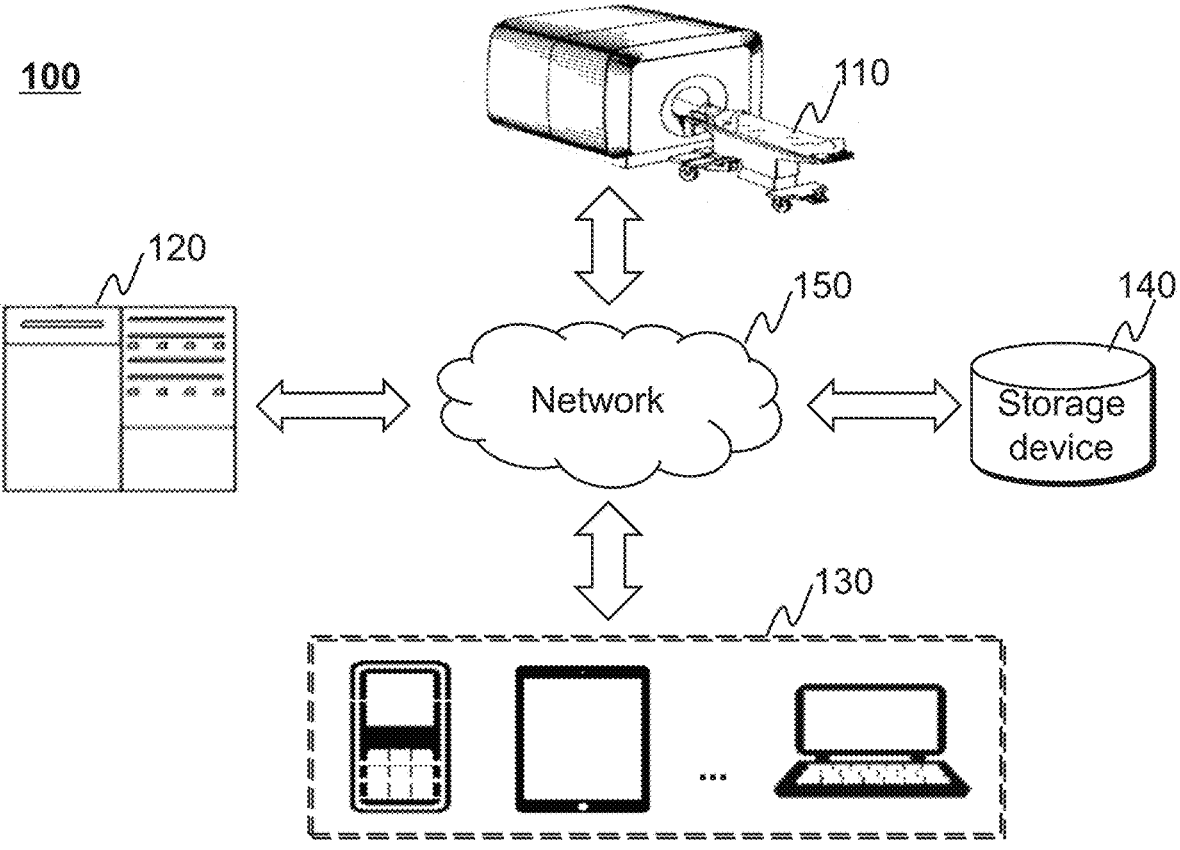
FIG. 1 is a schematic diagram illustrating an application scenario of an exemplary system for geometric correction based on image tracking according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings and on the premise of not paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, the words may be replaced by other expressions if other words may achieve the same purpose.

As used in the present disclosure and the claims, the singular forms "a," "an," and "the" may be intended to include the plural forms as well, unless the context clearly indicates otherwise. Generally, the terms "include" and "comprise" suggest only the inclusion of clearly identified operations and elements. They do not constitute an exclusive list, and the method or device may also include other operations or elements.

Flowcharts are used in the present disclosure to illustrate the operations performed by the system according to the embodiment of the present disclosure. It should be appreciated that the preceding or following operations are not necessarily performed in an exact sequence. Instead, operations may be processed in reverse order or simultaneously. Also, it is possible to add other operations to these processes or remove an operation or operations from them.

FIG. 1 is a schematic diagram illustrating an application scenario of an exemplary system for geometric correction based on image tracking according to some embodiments of the present disclosure. In some embodiments, as shown in FIG. 1, an application scenario 100 of the system for geometric correction based on image tracking may include at least an imaging device 110, a processing device 120, a terminal device 130, a storage device 140, and a network 150.

The imaging device 110 may scan a target object within a detection region or a scanning region to obtain scanning data of the target object. In some embodiments, the target object may include a biological object and/or a non-biological object. For example, the target object may include a patient, an artificial object, etc. In some embodiments, the target object may include a particular portion of a body, such as a head, a chest, an abdomen, etc., or any combination thereof. In some embodiments, the target object may include a specific organ, such as a heart, an esophagus, a trachea, a bronchus, a stomach, a gallbladder, a small intestine, a colon, a bladder, a ureter, a uterus, a fallopian tube, etc., or any combination thereof. In some embodiments, the target object may include a region of interest (ROI), such as a tumor, a node, etc.

In some embodiments, the imaging device 110 may scan a geometric model to obtain scanning data for the geometric model. In some embodiments, the imaging device 110 may be configured to obtain a plurality of projection images of the geometric model, the projection images including a projection marker corresponding to an original marker in the geometric model.

A geometric model may be a model used for the geometric correction. The geometric model may be a cylinder, a sphere, a prism, a rectangle, a cube, a cone, a pyramid, etc. or any combination thereof.

In some embodiments, an interior of the geometric model may include one or more markers (e.g., the markers may be embedded within the geometric model and may be stationary relative to the geometric model), and a substance of the geometric model may have a density different from the density of the markers. In some embodiments, the geometric model may be transparent or translucent, and human eyes may be able to recognize the one or more markers within the geometric model. In some embodiments, the geometric model may be opaque, and the human eyes may not be easily able to identify the one or more markers inside the geometric model. However, after being scanned by an imaging device (e.g., the imaging device 110), and after an image is generated, the one or more markers inside the geometric model may be identified from the image. In some embodiments, the marker may be composed of a high attenuation material. For example, the marker may be composed of a high attenuation material such as a steel, a tin, a barium, etc.

In some embodiments, a mode of scanning utilizing the imaging device may include, and not limited to, taking a preset number of projection images at equal angular intervals during an all-round rotation of the geometric model. The preset number may be determined based on experience, a demand, and/or a imaging parameter. For example, in a case where the geometric model is a cylinder, and the preset number is 100, the processing device 120 may, during an all-round rotation of the cylinder around an axis of the cylinder (360 degrees), take adjacent projection images at a 3.6 degree angular interval, and take 100 projection images.

In some embodiments, the imaging device 110 may be or may include an X-ray imaging device. For example, the X-ray imaging device may include a digital subtraction angiography (DSA) device, a digital radiography (DR) device, a computed radiography (CR) device, a digital fluorography (DF) device, a mammography machine, a C-arm device, etc. In some embodiments, the imaging device 110 may include a single mode scanner and/or a multimode scanner. The single mode scanner may include, for example, a CT scanner, an MRI (magnetic resonance imaging) scanner, etc.

The multimode scanner may include, for example, an X-ray imaging-magnetic resonance imaging (X-ray-MRI) scanner, a digital subtraction angiography-magnetic resonance imaging (DSA-MRI) scanner, etc., or any combination thereof. The foregoing related descriptions of the imaging device are for illustrative purposes only and are not intended to limit the scope of the present disclosure.

The processing device 120 may process data and/or information obtained from the imaging device 110, the terminal device 130, the storage device 140, and/or other components of the application scenario 100 of the system for geometric correction based on image tracking. For example, the processing device 120 may obtain the image (e.g., a medical image, a projection image of the geometric model, etc.) from the terminal device 130, the storage device 140, and analyze and process the image.

In some embodiments, the processing device 120 may process a projection image of the geometric model obtained from the imaging device 110. In some embodiments, the processing device 120 may obtain an initial correspondence between the projection markers and the original markers in at least one of the projection images; determine a target correspondence between the original markers and the projection markers in a tracked projection image by tracking, based on a correlation between the projection images, the projection markers; and perform, based on the target correspondence. In some embodiments, a mode for performing the tracking may include, but not limited to: calculating distances of the projection markers in the plurality of projection images, determining a correspondence between markers based on the distances; tracking the correspondence between markers by a machine learning model (a recognition model), etc.

In some embodiments, the processing device 120 may be a single server or group of servers. In some embodiments, the processing device 120 may be local or remote. For example, the processing device 120 may access information and/or data from the imaging device 110, the terminal device 130, and/or the storage device 140 via the network 150. In some embodiments, the processing device 120 may be implemented on a cloud platform.

In some embodiments, the processing device 120 and the imaging device 110 may be integrated. In some embodiments, the processing device 120 and the imaging device 110 may be directly or indirectly connected to act in conjunction to realize the methods and/or functions described in some embodiments of the present disclosure.

The terminal device 130 may communicate and/or connected with the imaging device 110, the processing device 120, and/or the storage device 140. In some embodiments, an interaction with a user may be achieved via the terminal device 130. In some embodiments, the terminal device 130 may include a mobile device, a tablet, a laptop, etc., or any combination thereof. In some embodiments, the terminal device 130 (or all or a portion of functions of the terminal device 130) may be integrated in the processing device 120.

The storage device 140 may store data, instructions, and/or any other information. In some embodiments, the storage device 140 may store data (e.g., the projection images of the geometric model, tracking results, etc.) obtained from the imaging device 110, the processing device 120, and the terminal device 130, etc. In some embodiments, the storage device 140 may store the data and/or instructions used by the processing device 120 to execute or use to accomplish the exemplary methods described in the present disclosure.

In some embodiments, the storage device 140 may include one or more storage components. In some embodiments, the storage device 140 may include a random access memory (RAM), a read-only memory (ROM), a removable memory, etc., or any combination thereof. In some embodiments, the storage device 140 may be implemented on a cloud platform. In some embodiments, the storage device 140 may be a portion of the imaging device 110, the processing device 120, and/or the terminal device 130.

The network 150 may include any suitable network capable of facilitating an exchange of information and/or data. In some embodiments, at least one component of the application scenario 100 of the system for geometric correction based on image tracking (e.g., the imaging device 110, the processing device 120, etc.) may be able to exchange information and/or data via the network 150 with other components. For example, the processing device 120 may obtain the medical image, the projection image of the geometric model, etc. from the imaging device 110 via the network 150.

It should be noted that the foregoing descriptions of the application scenario 100 of the system for geometric correction based on image tracking are provided for illustrative purposes only and are not intended to limit the scope of the present disclosure. For those skilled in the art, a variety of changes or modifications may be made in accordance with the description of the present disclosure. For example, the application scenario 100 of the system for geometric correction based on image tracking may be implemented similarly or differently on other devices. However, these changes and modifications may not depart from the scope of the present disclosure.

Figure 2:
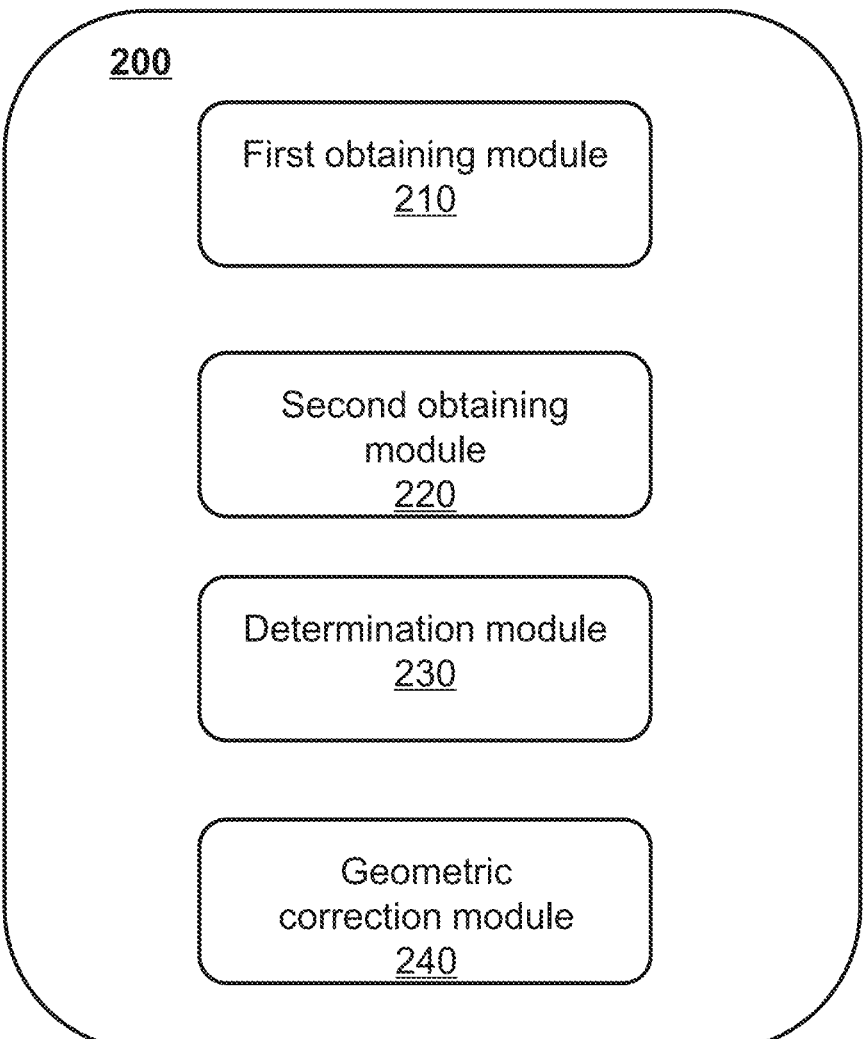
FIG. 2 is a module diagram illustrating an exemplary system for geometric correction based on an image tracking according to some embodiments of the present disclosure.

FIG. 2 is a module diagram illustrating an exemplary system for geometric correction based on an image tracking according to some embodiments of the present disclosure; As shown in FIG. 2, in some embodiments, a system for geometric correction based on image tracking 200 may include a first obtaining module 210, a second obtaining module 220, a determination module 230, and a geometry correction module 240. In some embodiments, corresponding functions of the system for geometric correction based on image tracking 200 may be performed by the processing device 120.

In some embodiments, the first obtaining module 210 may be configured to obtain a plurality of projection images of the geometric model, the projection images including projection markers corresponding to the original markers in the geometric model.

In some embodiments, the first obtaining module 210 may be configured to obtain a imaging parameter of the geometric model; and generate the plurality of projection images of the geometric model, based on the imaging parameter.

Figure 9:
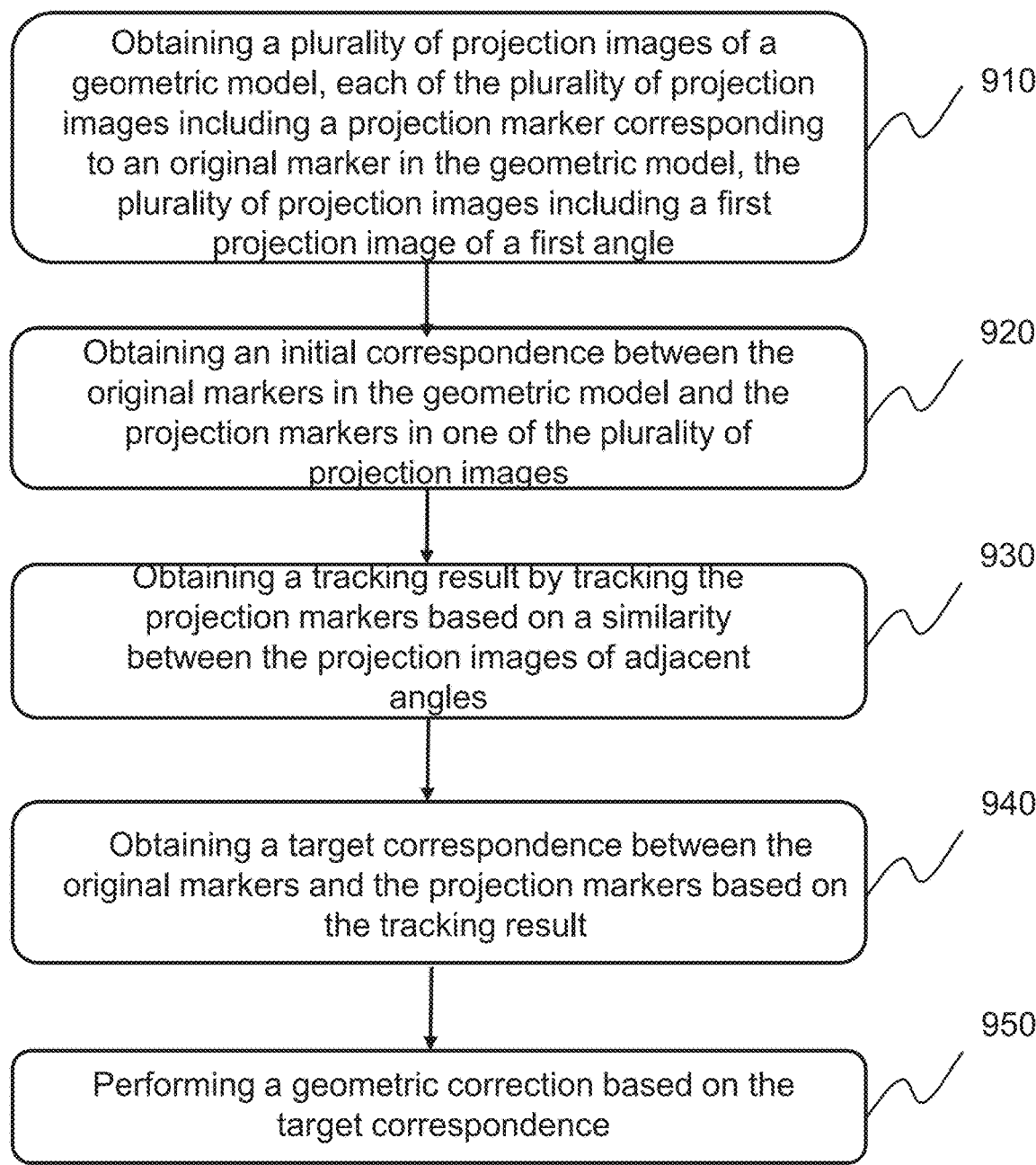
FIG. 9 is a flowchart illustrating an exemplary method for geometric correction based on image tracking according to some other embodiments of the present disclosure.

For more descriptions of determining the imaging angle and obtaining the plurality of projection images may be found in FIGS. 3, 9 and the related descriptions.

In some embodiments, the second obtaining module 220 may be configured to obtain an initial correspondence between the projection markers and the original markers in the at least one projection image. In some embodiments, the second obtaining module 220 may be configured to determine the projection image satisfying a first preset condition as a reference projection image; and obtain the initial correspondence between the original markers in the geometric model and the projection markers in the reference projection image. For more description of obtaining the initial correspondence, please refer to FIGS. 3, 9, and the related descriptions.

In some embodiments, the determination module 230 may be configured to determine a target correspondence between the original markers in the geometric model and the projection markers in the tracked projection image by tracking the projection markers based on the initial correspondence and a correlation between the projection images.

In some embodiments, the determination module 230 may be further configured to determine, based on a first projection image, a first projection marker, and a first correspondence between the original marker and the first projection marker in the first projection image; determine, based on a second projection image, a second projection marker; and determine, based on a position relationship between the second projection marker and the first projection marker, a mapping relationship between the second projection marker and the first projection marker; and determine the target correspondence between the original markers in the geometric model and the projection markers in the tracked projection image, based on the first correspondence and the mapping relationship between the second projection marker and the first projection marker.

In some embodiments, the determination module 230 may be further configured to track the projection markers in the plurality of projection images, based on the correlation of the similar projection images.

In some embodiments, the determination module 230 may be further configure to track the projection markers using a recognition model, the recognition model being a machine learning model. For more descriptions of tracking the projection markers, please refer to FIGS. 3, 6, 8, and 9, and the related descriptions.

In some embodiments, the geometric correction module 240 may be configured to perform, based on the target correspondence and the second angle, a geometric correction. For more descriptions on the geometric correction, please refer to FIGS. 3, 9, and the related descriptions.

It should be noted that the above descriptions of the system and the modules of the system are provided only for the convenience of description and as an illustration, and does not limit the present disclosure to the scope of the cited embodiments. It may be understood that for those skilled in the art, after understanding the principle of the system, it may be possible to arbitrarily combine the individual modules or form a sub-system to be connected to the other modules without departing from the principle.

FIG. 3 is a flowchart illustrating an exemplary process for geometric correction based on image tracking according to some embodiments of the present disclosure. In some embodiments, a process 300 may be performed by the processing device 120 or the system for geometric correction based on image tracking 200. For example, the process 300 may be stored in a storage device (e.g., the storage device 140, a storage unit of the processing device 120) in a form of a program or an instruction, and when the processor or the module shown in FIG. 2 executes the program or the instruction, the process 300 may be implemented. In some embodiments, the process 300 may be accomplished using one or more of the additional operations not described below, and/or not by one or more of the operations discussed below. Additionally, an order of the operations as shown in FIG. 3 is not limiting. As shown in FIG. 3, the process 300 may include the following operations.

In 310, a plurality of projection images of a geometric model may be obtained. Each of the plurality of projection images may include a projection marker corresponding to the original marker in the geometric model, wherein the plurality of projection images corresponding to a plurality of imaging angles.

The projection image refers to an image obtained by scanning and/or shooting a geometric model, for example, a two-dimensional (2D) image obtained by scanning and/or shooting a geometric model by an optical imaging device, a medical imaging device (e.g., the imaging device 110), etc.

In some embodiments, the projection image may be an 2D image in a projection coordinate system with an origin at an upper left corner of the projection image. The origin of the image may be located at other positions, e.g., the center of the projection image, and the present disclosure makes no limitation here.

In some embodiments, the projection image may include a projection marker corresponding to an original marker in the geometric model.

The origin marker is a solid marker exists in the geometric model. The projection marker may be a projection of the origin marker in the corresponding projection image. In some embodiments, the marker may be one or more of a sphere, a cube, a cross mark, a solid line, etc.

Figure 7:
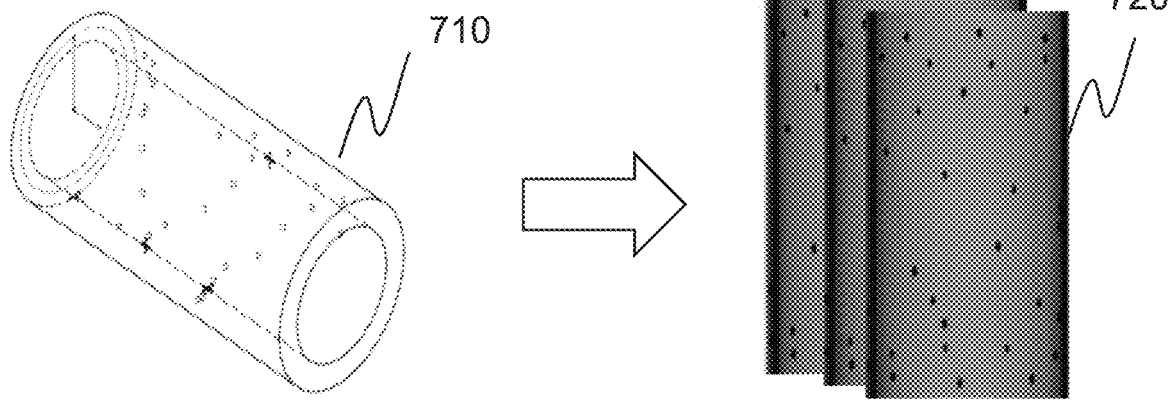
FIG. 7 is a schematic diagram illustrating an exemplary projection according to some embodiments of the present disclosure.

In some embodiments, there may be a correspondence between the original marker and the projection marker. In some embodiments, there may be two or more original marker in the geometric mode. There may be two or more projection markers in each of the plurality of projection images. Each of the two or more projection markers may correspond to one of the two or more original markers. There may be a correspondence between the projection marker and the corresponding original marker in the geometric model. For example, as shown in FIG. 7, each projection marker in the projection image 720 may be a projection of one of the origin markers in the geometric model 710 in the 2D image.

In some embodiments, the processing device 120 may obtain a plurality of projection images in various ways. For example, the processing device 120 may obtain the plurality of projection images by scanning the geometric model by an imaging device, such as the imaging device 110. For another example, the processing device 120 may obtain the plurality of projection images through a storage device, reading a database, calling data interface, etc., either internal or external to the system for geometric correction based on image tracking 200. For related descriptions of the geometric modal, please refer to FIG. 1.

In some embodiments, the processing device 120 may obtain a imaging parameter of a target object; and obtain a plurality of projection images of the geometric model based on the imaging parameter.

The imaging parameter refers to data related to scanning the geometric model. For example, the imaging parameter may include a imaging angle, a voltage value, a number (count) of images to be scan, etc.

The imaging angle may be an angle at which the geometric model is photographed. In some embodiments, during a rotation of the geometric model or the imaging device, the imaging angle may be an angle between the scanning device and a reference point on the geometric model. The geometric model or the imaging device may rotate around a central axis. The reference point may be obtained by the system preset or by manually preset.

There may be one or more imaging angles. Angle differences between the plurality of imaging angles may be the same or different.

In some embodiments, the imaging angles may be an angle sequence, which includes the angles of the geometric model in a plurality of scans. The angle sequence may be arranged according to in a scanning sequence.

In some embodiments, the imaging angles may be preset based on experience or historical data, etc.

In some embodiments, the processing device 120 may determine at least a group of angle differences between adjacent scans based on the imaging parameter, and determine the at least one imaging angle based on the angle differences.

The adjacent scans may refer to scans that are adjacent to each other in a scanning sequence.

The angle difference refers to a difference in the imaging angles in a group of adjacent scans. In some embodiments, the angle differences in the at least one group of adjacent scans may constitute an angle difference sequence. The angle differences in the angle difference sequence may be the same or different.

In some embodiments, the processing device 120 may determine the angle difference of at least one group of adjacent scans based on the imaging parameter in various ways.

For example, the processing device 120 may determine the angle difference between at least one group of adjacent scans by checking a first preset table based on the imaging parameter. The first preset table may include different imaging parameters and their corresponding angle differences for the at least one group of adjacent scans. The first preset table may be preset based on the experience or the historical data, etc.

For another example, the processing device 120 may determine a number (count) of images to be scanned, and thus determine an angle difference between at least one group of adjacent scans based on the count of the plurality of images. The number of images to be scanned may be preset based on experience or historical data, etc. The images to be scanned may be projections. For example, if the scanning portion is the head, the count of the plurality of images may be large; if the scanning portion is the arm, the count of the plurality of images may be small. For another example, the greater the scan field, the greater the count of the plurality of images.

In some embodiments, the angle difference may be a ratio of a preset angle range to the count of the plurality of images. The preset angle range refers to a range of angles at which the geometric model is scanned. For example, when the preset angle range is one circle (360°), and the count of the plurality of images is 100, the angle difference may be 3.6°.

In some embodiments, the processing device 120 may preset an initial imaging angle, and then determine at least one imaging angle by the angle difference. For example, the processing device 120 may preset the initial imaging angle to be 12 degrees, and the angle difference to be 1 degree, and then on the basis of the initial imaging angle, for every one image taken, one degree may be added as the imaging angle of the next image.

In some embodiments, the processing device 120 may determine at least one imaging angle based on the angle difference and the preset angle range. For example, the processing device 120 may use an angle corresponding to one of the range boundaries of the preset angle range as the initial imaging angle, and then determine the at least one imaging angle by the angle difference.

In some embodiments, the processing device 120 may obtain a plurality of projection images of the geometric model based on the imaging angle. There may be at least one imaging angle, and one or more projection images may be obtained from each imaging angle.

In some embodiments, the processing device 120 may take a preset number of projection images at equal angular intervals during an all-round rotation of the geometric model, and the preset number may be determined based on the experience, the demand, and/or the imaging parameter. As an example, in the case where the geometric model is a cylinder and the preset number is 100, the first obtaining module 210 may, in a process of the all-round rotation of the cylinder around an axis of the cylinder (360 degrees), take adjacent projection images at a 3.6 degree of angular interval, and take 100 projection images.

In some embodiments of the present disclosure, by determining the angle difference based on the imaging parameter, and then determining the imaging angle, thereby obtaining the plurality of projection images of the geometric model, a plurality of imaging angles of the geometric model and the corresponding projection images are quickly and accurately obtained. In this way, there is no need for setting the imaging angle s one by one, which improves an imaging efficiency.

In 320, an initial correspondence between the original marker in the geometric model and the projection marker in one of the plurality of projection images may be obtained.

The correspondence refers to a corresponding relationship between projection coordinates of the projection marker and the model coordinates of the original marker. In some embodiments, the model coordinates may be three-dimensional (3D) coordinates in a space, with an origin at a geometric center of the geometric model and a specific measuring unit, such as millimeters. The origin of the model coordinates may further be other positions of the geometric model, for example, a centroid or a center of gravity of the geometric model, etc., which is not limited here. The projection coordinates may be pixel-based 2D coordinates with an origin of the projection coordinates at an upper left corner of the projection image and a unit of pixels. The original of the projection coordinates may further be at other positions, for example, at a lower right corner of the projection image, at the center of the projection image, etc., which is not limited here. The foregoing relevant examples of the model and projection coordinates are for illustrative use only and are not intended to limit the scope of the present disclosure.

The initial correspondence refers to an initially determined correspondence between the projection markers and the original markers. The initial correspondence may be used for processing in subsequent operations. In some embodiments, the initial correspondence may include a correspondence between each projection marker in at least one of the projection images and the corresponding original marker. In some embodiments, the initial correspondence may include a correspondence between each projection marker in any one of the projection image and the corresponding original marker. In some embodiments, the initial correspondence may include a correspondence of each projection marker in a reference projection image and the corresponding original marker.

In some embodiments, the processing device 120 may obtain the initial correspondence between the projection markers in the projection image and the original markers in various modes. For example, the processing device 120 may automatically recognize the initial correspondence between the projection markers in the reference projection image and the original markers. For another example, the processing device 120 may obtain the initial correspondence between the projection markers in the projection image and the original markers through a storage device within or outside of the system for geometric correction based on image tracking 200, through a database reading, or through a call data interface, etc. For another example, the processing device 120 may obtain the initial correspondence between the projection markers and the original markers in the projection image by obtaining a manual correction result.

In some embodiments, the processing device 120 may obtain the initial correspondence between the projection markers and the original markers in the plurality of projection images in various modes. For the specific modes, please refer to the foregoing mode of obtaining the initial correspondences between the projection marker in the projection image and the original markers.

In some embodiments, the processing device 120 may determine a reference projection image; and obtain the initial correspondence between the original markers in the geometric model and the projection markers in the reference projection image.

The reference projection image may be a benchmark and/or an initial projection image for the image tracking.

In some embodiments, the correspondence between each projection marker in the reference projection image and each original marker in the geometric model may be obtained by manual labeling.

The processing device 120 may obtain the reference projection image in various ways. In some embodiments, the processing device 120 may obtain the reference projection image by obtaining a user input. In some embodiments, the processing device 120 may determine the reference projection image in the plurality of projection images by a random selection.

In some embodiments, the processing device 120 may determine the projection image that satisfies a first preset condition as the reference projection image. For more details on determining the reference projection image, please refer to FIG. 4 and the related descriptions.

In 330, a target correspondence between the original markers in the geometric model and the projection markers in the tracked projection image may be determined by tracking, based on the initial correspondence and a correlation of the plurality of projection images, the projection markers in the plurality of projection images.

The correlation of the plurality of projection images refers to a property of correlation between projection images. For example, a plurality of projection markers may be arranged similarly in the plurality of projection images, the coordinates of each projection marker may be closer in the plurality of projection images, etc.

In some embodiments, the correlation between projection images may be obtained based on an empirical preset. In some embodiments, the processing device 120 may determine the correlation between the projection images by statistically analyzing the position features, arrangement features, etc. of the multiple projection markers in the multiple projection images.

In some embodiments, the processing device 120 may track the plurality of projection markers in a variety of ways based on the correlation between the plurality of projection images. In some embodiments, the processing device 120 may track the projection markers through the correlation between the projection images and the projection coordinates of the projection markers. For example, the processing device 120 may randomly select a first projection image and a second projection image among the plurality of projection images and obtain the projection coordinates of each projection marker in the two projection images. The processing device 120 may further determine a distance between the projection coordinates of each projection marker in the two projection images. For any one of the projection markers in the first projection image, in response to determining that an absolute value of a coordinate difference between the second projection marker and the first projection marker (hereinafter referred to as the absolute value of the difference of the coordinate) is the smallest, it may be determined that the two projection markers are the projection markers corresponding to the same original marker. The foregoing operation may be performed sequentially between the second projection image and the third projection image, the third projection image and the fourth projection image, . . . , the nth projection image and the last projection image to complete the tracking of the projection markers.

In some embodiments, the processing device 120 may track the projection markers in the plurality of projection images, based on the correlation of the adjacent projection images. The adjacent projection image refers to projection image which is adjacent to the scanning order of a certain projection image.

In some embodiments, the processing device 120 may determine, by the foregoing tracking mode, that there is an alternative correspondence between the original markers and the projection markers for which the absolute value of the coordinate difference satisfies a preset alternative condition. The preset alternative condition may be that the absolute value of the coordinate difference is less than an absolute value threshold and is not the minimum absolute value. The absolute value threshold may be a system default, a system preset, a human preset, etc.

In some embodiments, the processing device 120 may determine a first projection marker based on a first projection image, and a first correspondence between the original marker and the first projection marker in the first projection image. The processing device 120 may further determine a second projection marker based on a second projection image, and determine a mapping relationship between the second projection marker and the first projection marker based on a position relationship between the second projection marker and the first projection marker. For more contents on the mapping relationship, please refer to FIG. 6 and the related descriptions.

In some embodiments, the processing device 120 may track the projection markers in the plurality of projection images using a recognition model, the recognition model being a machine learning model. For the recognition model and a training of the recognition model, please refer to FIG. 8 and the related descriptions.

The target correspondence refers to the correspondence between the projection markers in the tracked projection image and the original markers. There may be a target correspondences between each marker and each projection marker in one tracked projection image. There may be a plurality of correspondences between each original marker and the projection markers in the projection images taken from the plurality of imaging angles. For example, the projection marker corresponding to an original marker A in the tracked projection image X1 may be projection markers A1, the projection marker corresponding to an original marker B in the tracked projection image X1 may be projection markers B1, the projection marker corresponding to an original marker C in the tracked projection image X1 may be projection markers C1, the projection marker corresponding to an original marker D in the tracked projection image x1 may be projection markers D1, etc. Then the target correspondence may include the correspondence between the original marker A and the projection marker A1, the correspondence between the original marker B and the projection marker B1, the correspondence between the original marker C and the projection marker C1, and the correspondence between the original marker D, and the projection marker D1.

In some embodiments, the processing device 120 may directly determine the target correspondence between the original markers and the projection markers based on a tracking result. For example, the processing device 120 may determine, based on the original marker and the projection markers obtained by tracking the original marker in each of the projection images, the correspondence between the model coordinates of the original marker and the projection coordinates of the projection markers in each of the projection images.

In 340, a geometric correction may be performed based on the target correspondence.

The geometric correction may be a process of eliminating or correcting geometric errors. Geometric artifacts in a reconstruction image caused by the geometric errors may be eliminated or reduced by the geometric correction.

In some embodiments, the processing device 120 may perform the geometric correction based on the target correspondence through modes such as a two-metal marker geometric correction, an iterative geometric correction, etc. The geometric correction may also be performed by various pre-existing or other feasible modes.

In some embodiments, the processing device 120 may determine a second angle of the geometric model in the plurality of projection images, based on a first angle of the geometric model in a reference projection image; and perform a geometric correction on the reconstruction images, based on the target correspondence and the second angle. The reconstruction images refer to medical images reconstructed from the scanned data of a scanned object.

The first angle refers to a benchmark and/or an initial imaging angle of the image tracking. The first angle is the scanning angle corresponding to the reference projection image.

The processing device 120 may obtain the first angle in various ways. In some embodiments, the processing device 120 may obtain the first angle by obtaining a user input. In some embodiments, the processing device 120 may determine the imaging angle corresponding to the reference projection image as the first angle.

The second angle may be an angle other than the first angle. There may be one or more second angles.

In some embodiments, the processing device 120 may determine the second angle of the geometric model in the projection image based on the first angle and the angle difference of the geometric model in the reference projection image. For example, the reference projection image may be a second projection image in a plurality of continuous projection images, the first angle may be degree a, the angle difference may be degree b, and the projection image corresponding to the second angle may be the eighth projection image. Then the processing device 120 may determine that the second angle is a+6b degrees based on the first angle and the angle difference.

In some embodiments, the processing device 120 may perform the geometric correction based on the target correspondence and the second angle. For example, the processing device 120 may perform the geometric correction based on the target correspondence and the second angle through a two-metal marker geometric correction, an iterative geometric correction, etc.

It should be noted that the above operations are not necessarily sequential, and that the order of certain operations may be adjusted, and the present disclosure does not limit this. For example, some embodiments may perform operation 340 before operation 330, etc.

In some embodiments of the present disclosure, by tracking the marker based on the relationship between the projection images, the correspondence may be efficiently and accurately determined, which helps in subsequent accurate geometric correction.

In some embodiments, the processing device 120 may generate a 3D reconstruction image based on a correction result and the plurality of projection images; determine a projection result based on the 3D reconstruction image; and determine whether the geometric correction is successful based on the projection results an actual projection data of the geometric model.

The correction result refers to the result obtained after eliminating the geometric error. For example, the position of the projection marker in the projection image corresponding to the second angle, etc. may be obtained after correction. In some embodiments, the correction result may include a result after the geometric correction of one or more of the imaging angles.

The 3D reconstruction image refers to a 3D image obtained after a 3D reconstruction of the plurality of projection images.

In some embodiments, the processing device 120 may generate the 3D reconstruction image based on the correction result and the plurality of projection images through a 3D reconstruction algorithm, a machine learning model, etc. The 3D reconstruction may also be performed by a variety of pre-existing or other feasible ways.

The projection result refers to data result obtained after the projection of the 3D reconstruction image. For example, the projection image of the 3D reconstruction image, etc. The projection result may include the projection result corresponding to one or more imaging angles.

In some embodiments, the processing device 120 may calculate the projection result at a determined target angle based on the 3D reconstruction image.

The target angle refers to the imaging angle at which the projection result needs to be obtained. There may be one or more target angles. The target angle may be determined in various ways. In some embodiments, the target angle may be preset based on the experience or the demand. In some embodiments, the processing device 120 may select the original imaging angle (i.e., a non-optimized imaging angle) within a target angle range and/or a boundary angle range as the target angle. In some embodiments, the processing device 120 may identify an outlier in an angle difference cumulative sequence (e.g., a value that is significantly greater or less than other angle difference cumulative values) as the target angle.

The actual projection data refers to a projection data result of an actual geometric model. For example, the projection image of the geometric model, etc.

In some embodiments, the processing device 120 may directly obtain the actual projection data based on the imaging device 110, etc.

In some embodiments, the processing device 120 may determine, based on the projection result and the actual projection data of the geometric model, a difference result between the projection result and the actual projection data of the geometric model, and compare the difference result with a preset difference threshold. In response to the aforementioned difference result being less than the preset difference threshold, the processing device 120 may determine that the correction is successful, and in response to the aforementioned difference result being not smaller than the preset difference threshold, the processing device 120 may determine that the correction is failed.

The difference result refers to a data result related to the difference between the projection result and the actual projection data. For example, the difference result may be a distance between coordinates of the projection marker and coordinates of the corresponding projection markers in the actual projection data, etc. The preset difference threshold may be preset based on the experience or the demand.

In some embodiments, in response to the failure of the correction, the processing device 120 may perform a second correction based on the alternative correspondence and the second angle, and determine whether the second correction is successful; in response to the failure of the second correction, the scan and the tracking may be re-performed.

In some embodiments, in response to a first number of imaging angle corrections, the processing device 120 may perform the scan within an angle range of the failed corrections, and may re-perform the track. The scan may be re-performed based on an adjusted angle difference. The adjusted angle difference may be determined in various ways. For example, the adjusted angle difference may be determined based on a plurality of trials, etc.

In some embodiments, in response to a failure of a second number of scan angle corrections, the processing device 120 may check whether the first angle is incorrect or feedback error information to the terminal device 130.

The first number, the second number refer to the number of imaging angles for which the correction failed. In some embodiments, the first number may be less than or equal to a first number threshold. The first number threshold may be preset based on the experience or the demand. In some embodiments, the second number may be greater than the first number threshold.

For more contents on the alternative correspondence, and the correction mode, please refer to the aforementioned related description. For more contents on the tracking mode, please refer to FIG. 5 and the related descriptions.

In some embodiments of the present disclosure, by determining whether the correction is successful, it is possible to evaluate the correction result in real time and efficiently, so as to determine strengths and weaknesses of the correction result and to make adjustments timely. In response to the failure of the correction, a second correction may be performed based on the alternative correspondence. In response to the failure of the second correction, the scanning may be re-performed, and the track may be re-performed, or the first angle may be checked, or the error information may be fed back, so that a follow-up processing mode may be determined timely when the correction fails. In this way, remedial measures may be performed intelligently, so as to avoid an increase of manual workload due to the failure of the correction, etc.

In some embodiments, the processing device 120 may also rotate the imaging device in accordance with the angle difference by controlling the imaging device and obtaining the projection image; determine the angle difference of the next adjacent scan based on the current projection image and perform a tracking; and, in response to tracking one round, the processing device 120 may perform the correction and determine whether the correction is successful.

In some embodiments, the processing device 120 may control the imaging device to obtain a projection image for each angle difference in rotation. The angle difference may be preset based on the experience or demand.

In some embodiments, the processing device 120 may determine the angle difference of the next adjacent scan based on the current projection image by a preset determination rule. The predetermination rule may be preset based on the experience or demands.

In some embodiments, the preset determination rule may be as follows: before determining the first angle, determining whether the current projection image satisfies the first preset condition; in response to the current projection image satisfying the first preset condition, determining that the imaging angle corresponding to the current projection image is the first angle, and determining the angle difference of the next adjacent scan as a first preset value. In response to the current projection image not satisfying the first preset condition, determining whether a specific projection marker exists in the current projection image; in response to determining that the specific projection marker exists in the current projection image, determining, based on a deviation degree from the specific projection marker, the angle difference of the next adjacent scan; in response to determining that the specific projection marker does not exist in the current projection image, determining the angle difference of the next adjacent scan as a second preset value.

In some embodiments, the first preset value may be less than the second preset value. The first preset value and the second preset value may be a system default value, an empirical value, an artificial preset value, etc., or any combination thereof. The first preset value and the second preset value may be set according to the actual demands, and the present disclosure does not make any limitation thereon.

In some embodiments, the deviation degree may be a deviation value between a position of the projection marker in the one of the plurality of projection images and a preset position corresponding to the first preset condition. In some embodiments, the deviation value may be expressed as a distance between the projection coordinates. In some embodiments, the processing device 120 may determine the distances through a distance formula, etc., and thus obtain the deviation degree. In some embodiments, the processing device 120 may determine the angle difference of the next adjacent scan based on the deviation degree by checking a correspondence table. The correspondence table includes different deviation degrees and their corresponding angle differences, and the correspondence table may be determined based on historical data or empirical presets.

Figure 4:
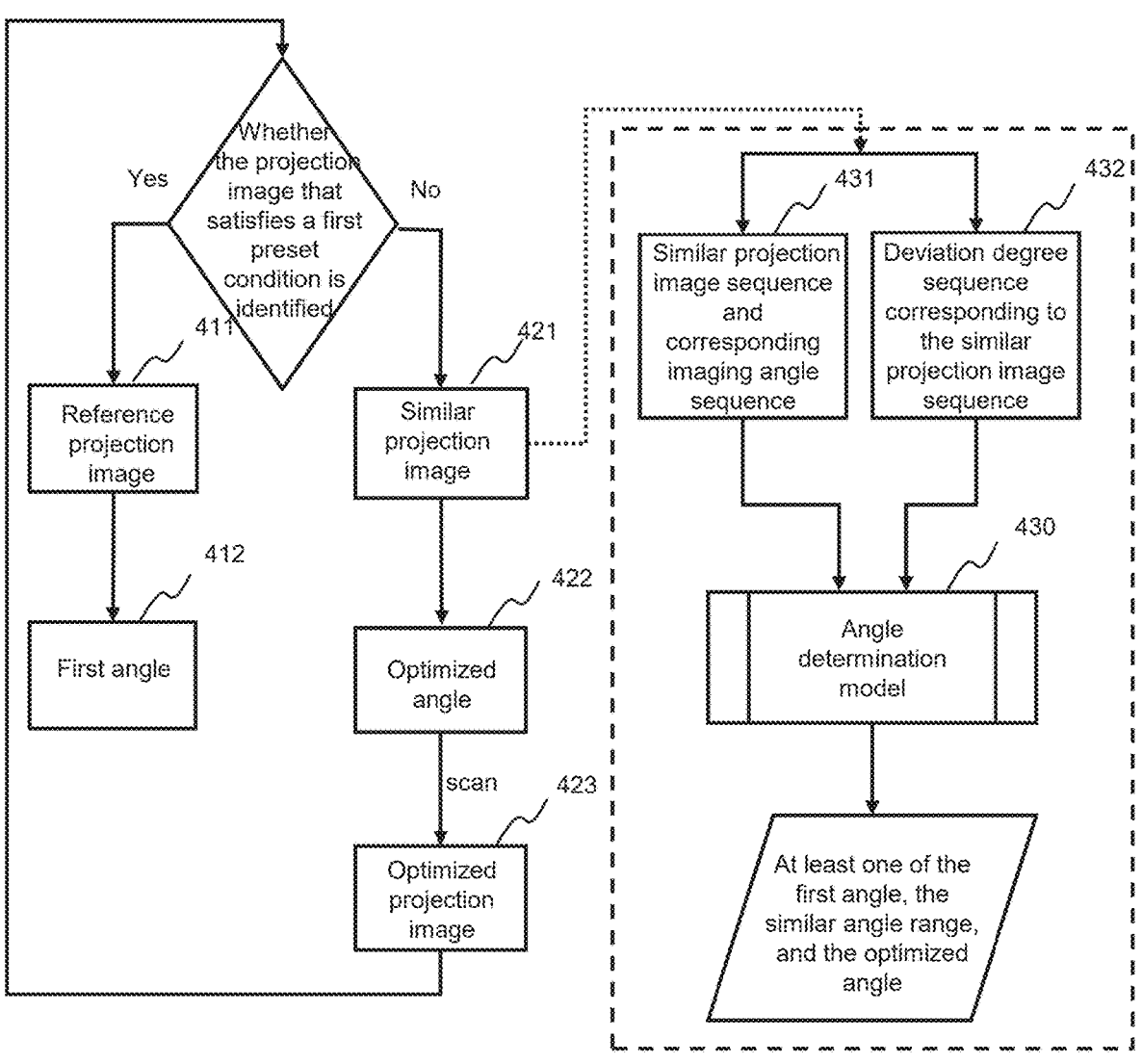
FIG. 4 is a schematic diagram illustrating an exemplary process for determining a reference projection image and a first angle according to some embodiments of the present disclosure.

For more descriptions on determining whether the first preset condition is satisfied, the specific projection marker, the deviation degree, and the preset position, etc. please refer to FIG. 4 and the related descriptions.

In some embodiments, after determining the angle difference, the processing device 120 may rotate the imaging device in accordance with the angle difference for the next adjacent scan and control the imaging device to obtain the next projection image.

It should be noted that, before determining the first angle, for each projection image obtained, the processing device 120 may determine whether the projection image satisfies the first preset condition, and determine the angle difference of the next adjacent scan based on a determination result until the first angle is determined. After determining the first angle, the processing device 120 may track the projection marker based on the correlation between the two projection images of the adjacent scans to obtain a tracking result. The processing device may further determine the angle difference of the next adjacent scan and the next projection image based on the tracking result, until the imaging device has tracked around the geometric model.

In some embodiments, the preset determination rule may be as follows: after determining the first angle, the angle difference of the next adjacent scan may be determined based on at least one historical tracking result. The historical tracking result may include at least one tracking result prior to the current tracking.

In some embodiments, in response to the at least one historical tracking result being a tracking failure, the processing device 120 may control the imaging device to step back for an angle difference and take another scan after reducing the current angle difference.

In some embodiments, in response to the at least one historical tracking result being the tracking failure, the processing device 120 may obtain a statistical value (e.g., a mean, a median, etc.) of the absolute value of the coordinate difference during the at least one historical tracking, and based on the statistical value of the absolute value of the coordinate difference as well as a first adjustment rule, the processing device 120 may determine the angle difference of the next adjacent scan. In some embodiments, the first adjustment rule may be as follows: in response to the statistical value of the absolute value of the coordinate difference being higher than a first upper limit threshold, decreasing the current angle difference as the angle difference for the next adjacent scan; in response to the statistical value of the absolute value of the coordinate difference being lower than a first lower limit threshold, increasing the current angle difference as the angle difference of the next adjacent scan.

In some embodiments, in response to the at least one historical tracking result being the tracking failure, the processing device 120 may obtain the statistical value (e.g., the mean, the median, etc.) of a correspondence confidence degree output by the recognition model, and determine, based on the statistical value of the correspondence confidence degree as well as a second adjustment rule, the angle difference of the next adjacent scan. In some embodiments, the second adjustment rule may be as follows: in response to the statistical value of the correspondence confidence degree being higher than a second upper limit threshold, increasing the current angle difference as the angle difference of the next adjacent scan; in response to the statistical value of the correspondence confidence degree being lower than a second lower limit threshold, decreasing the current angle difference as the angle difference of the next adjacent scan. For more descriptions on the recognition model and the correspondence confidence degree, please refer to FIG. 6 and the related descriptions.

The failed tracking result may include a failure to track the projection marker or a failure to track the projection image. For more descriptions on the tracking, please refer to FIG. 5 and the related descriptions.

A magnitude of increasing the angle difference and/or decreasing the angle difference may be preset based on the experience or the demand, or may be determined through multiple trials. The first upper limit threshold, the first lower limit threshold, the second upper limit threshold, and the second lower limit threshold may be a system default, an empirical value, an artificially preset value, etc., or any combination thereof, and may be set based on an actual demand, and the present disclosure does not limit this.

In some embodiments, the processing device 120 may, for each projection image scanned, determine the angle difference of the next adjacent scan, and perform the tracking, and obtain the next projection image after a successful tracking. The above operations may be repeated until the imaging device has tracked the geometrical model around (i.e., 360 degrees). After that, the correction may be performed using the aforementioned geometric correction mode, and the processing device 120 may further determine whether the correction is successful using the aforementioned determination mode.

In some embodiments of the present disclosure, through the mode of re-determining the angle difference by determining a situation before the first angle and a situation after the first angle, the angle difference that fits an actual tracking situation may be obtained reasonably and effectively.

In some embodiments of the present disclosure, by controlling the imaging device to rotate to obtain the projection image and perform the tracking, a dynamic process of scanning and tracking may be implemented, and a timely adjustment of the angle difference according to the actual scanning and tracking situation may be performed, so as to make the subsequent correction process more accurate.

FIG. 4 is a schematic diagram illustrating an exemplary process for determining a reference projection image and a first angle according to some embodiments of the present disclosure.

In some embodiments, the processing device 120 may determine whether the projection image that satisfies a first preset condition is identified, and determine the reference projection image in different modes based on different determination results.

In some embodiments, in response to determining that the projection image that satisfies the first preset condition is identified, the processing device 120 may determine the projection image that satisfies the first preset condition as a reference projection image 411.

The first preset condition refers to the condition for determining the reference projection image. In some embodiments, the first preset condition may include the projection images meeting at least one of a preset arrangement features, a preset position feature, etc. The preset position feature refers to the preset position features of a specific projection marker in the projection image. The preset arrangement feature refers to an arrangement feature of a rest of the projection markers when a specific projection marker is located at the specific position. The specific projection marker refers to a projection marker corresponding to a specific original marker. The specific original marker may be a marker located at a specific position or of a specific shape and size. For example, the specific original marker may be a great marker (greater in size relative to the rest of the markers) that is placed at a specific position in the middle of a plurality of markers, a small marker located in a middle position in an up-down direction (i.e., in the direction of a Y-axis of a projection coordinate system) and/or in a left-right direction (i.e., in the direction of an X-axis of the projection coordinate system) of the projection image, a small marker located in a leftmost position of the projection image along the left-right direction, etc. For example, the preset position feature may be a midpoint position of a centerline of a specific projection marker located in the left-right direction of the projection image. For another example, the preset position feature may be the leftmost position where the specific projection marker is located at the centerline in the up-down direction of the projection image. The specific original marker corresponds to the specific projection marker. For example, the preset arrangement feature may be the arrangement feature of all of the remaining projection markers when the specific projection marker is located on the centerline of the projection image. The foregoing examples related to the first preset condition are for illustrative use only and are not intended to limit the scope of the present disclosure.

In some embodiments, the first preset condition may be preset based on the experience or the demands.

In some embodiments, the projection image that satisfies the first preset condition may be determined to be the reference projection image, and the angle corresponding to the reference projection image may be the first angle. In some embodiments, a specific value of the first angle may also be determined by iterative examinations or other arbitrary feasible means.

In some embodiments, the processing device may select, from the plurality of projection images by an automatic detection algorithm, a reference projection image that satisfies the first preset condition. In some embodiments, the automatic detection algorithm may obtain a reference projection image by detecting a known feature and matching the known feature with the first preset condition. The known feature may include an arrangement feature of the projection marker, a position feature of the specific projection marker, etc.

In some embodiments, the automatic detection algorithm may determine the projection image in the plurality of projection images whose arrangement feature of the projection markers are the same as the preset arrangement feature or whose first matching degree is greater than a first matching degree threshold as the reference projection image. In some embodiments, the automatic detection algorithm may determine the projection image in the plurality of projection images whose position feature of the specific projection marker is the same as the preset position feature, or whose second matching degree is greater than a second matching degree threshold as the reference projection image. The first matching degree may indicate the similarity between the arrangement feature of the projection marker and the preset arrangement feature, and the second matching degree may indicate the similarity between the position feature of the specific projection marker and the preset position feature. The first similarity threshold and the second similarity threshold may be preset based on the experience or the demand.

In some embodiments of the present disclosure, by determining the projection image satisfying the first preset condition as the reference projection image, and taking an angle corresponding to the reference projection image as the first angle, there is no need to strictly limit an initial placement of the geometric model, so as to reduce an instability caused by a manual participation, reduce a consumption of human and material resources, and improve the efficiency and accuracy of the geometric correction.

In some embodiments, in response to determining that none of the plurality of projection images satisfy the first preset condition, the processing device 120 may extract an similar projection image 421 satisfying a second preset condition; determining, based on the similar projection image 421, an optimized angle 422 for scanning the geometric model; and determining the optimized projection image satisfying the first preset condition as the reference projection image.

In some embodiments, if no projection image appears in the plurality of projection images whose first matching degree between the arrangement feature and the preset arrangement feature of the projection marker exceeds a first matching degree threshold, or no projection image appears in the plurality of projection images whose second matching degree between the position feature and the preset position feature exceeds a second degree threshold, then it may be determined that the projection image satisfying the first preset condition is not matched.

The second preset condition refers to a condition used to determine the similar projection images. The second preset condition may be obtained based on the experience or the preset demand.

In some embodiments, the second preset condition may be that the first matching degree between the arrangement feature of the projection marker and the preset arrangement feature exceeds a third matching degree threshold. In some embodiments, the second preset condition may be that the second matching degree of the position feature of the specific projection marker and the preset position feature exceeds a fourth matching degree threshold. The third matching degree threshold and the fourth matching degree threshold may be preset based on the experience or the demands. The third matching degree threshold may be less than the first matching degree threshold, and the fourth matching degree threshold may be less than the second matching degree threshold.

The similar projection image 421 refers to a projection image whose known feature is similar to a preset feature. The known feature of the projection image may be considered to be similar to the preset feature when the known feature of the projection image satisfies the second preset condition. The preset feature may include the preset arrangement features, a preset position feature, etc.

In some embodiments, the processing device 120 may compare the known features of the plurality of projection images with the preset feature, and determine a continuous plurality of projection images that satisfy the second preset condition as the similar projection images 421.

In some embodiments, the optimized angle 422 may include an optimized angle difference and/or an optimized angle range. The optimized angle difference refers to an angle difference after optimizing. The optimized angle range refers to the preset angle range after optimizing.

In some embodiments, the processing device 120 may determine a plurality of optimized projection images 423 by re-scanning based on the optimized angle 422; determine whether the projection image that satisfies a first preset condition is matched. The processing device 120 may take the optimized projection images 423 satisfying the first preset condition as the reference projection image 411, and take an imaging angle corresponding to the reference projection image 411 as the first angle 412.

In some embodiments, the processing device 120 may determine the optimized angle 422 based on the similar projection image 421 through an adjacent angle range. The adjacent angle range refers to a range of imaging angles corresponding to the similar projection image 421. In some embodiments, the processing device 120 may determine the adjacent angle range of the plurality of similar projection images 421 as the optimized angle range. In some embodiments, the processing device 120 may add a certain angle based on the adjacent angle range of the plurality of similar projection images 421 as the optimized angle range. For example, if the imaging angles correspond to the similar projection images are d degrees, e degrees, and f degrees, respectively, the optimized angle range may be d–x degrees~f+x degrees, where x may be any value.

In some embodiments, the processing device 120 may reduce a certain angle based on the angle difference of an initial scan (subsequently referred to as an initial angle difference) as the optimized angle difference.

In some embodiments, the optimized angle may be determined based on a deviation degree. In some embodiments, the optimized angle difference and/or the optimized angle range may be determined based on the deviation degree.

In some embodiments, the deviation degree refers to a deviation of a position of a specific projection marker from a preset position corresponding to the preset feature. In some embodiments, the deviation value may be expressed as a distance between the projection coordinates. In some embodiments, the processing device 120 may obtain the deviation degree by calculating the distances by a coordinate distance formula, etc.

In some embodiments, the processing device 120 may determine the optimized angle difference and/or an angle amplification value based on the deviation degree by a first data comparison table. The first data comparison table may include different deviation degrees and their corresponding optimized angle differences and/or angle amplification values, and the first data comparison table may be determined based on historical data or an empirical preset. In some embodiments, the processing device 120 may calculate and determine the optimized angle range based on the adjacent angle range and the angle amplification value. For example, the processing device 120 may perform a range expansion according to the angle amplification value at both ends of the adjacent angle range to obtain the optimized angle range.

In some embodiments of the present disclosure, by determining the optimized angle based on the deviation degree, an effect of a position deviation of a specific projection marker from the preset position corresponding to the preset feature on the imaging angle may be considered, so as to determine a more accurate optimized angle.

In some embodiments, the processing device 120 may determine at least one of the first angle, the optimized angle range, and the optimized angle difference based on an angle determination model 430.

In some embodiments, the angle determination model 430 may be a machine learning model, such as, for example, a Long Short-Term Memory (LSTM) model, a Neural Network (NN) model, etc.

In some embodiments, an input of the angle determination model 430 may be an similar projection image sequence and a corresponding imaging angle sequence 431 and/or a deviation degree sequence 432 corresponding to the similar projection image sequence, and an output may be at least one of the first angle, the optimized angle range, and the optimized angle difference.

It should be noted that the first angle output from the angle determination model 430 may be a prediction value. At this time, the optimized projection image may not be actually re-scanned according to the optimized angle to obtain the optimized projection image, and the predicted first angle may be the imaging angle corresponding to the reference projection image in the optimized projection image.

In some embodiments, the angle determination model 430 may be obtained by training a plurality of first training samples with first labels. In some embodiments, each of the plurality of first training sample may include a sample similar projection image sequence and a corresponding sample imaging angle sequence, and/or a sample deviation degree sequence corresponding to the sample similar projection image sequence, and each of the plurality of first labels may include the optimized angle (including the optimized angle difference, the optimized angle range) corresponding to the sample similar projection image sequence, and the imaging angle corresponding to the reference projection image in the optimized projection image. The first training sample may be obtained based on the historical data, and the first label may be determined by manual labeling.

An exemplary training process may include: inputting a plurality of first training samples with the first labels into an initial angle determination model, constructing a loss function from the first labels and the output of the initial angle determination model, iteratively updating the initial angle based on the loss function to determine a parameter of the model. The model training may be completed when the loss function of the initial angle determination model satisfies a preset condition, and the trained angle determination model 430 may be obtained. The preset condition may be that the loss function converges, the number of iterations reaches a threshold, etc.

In some embodiments of the present disclosure, by determining at least one of the first angle, the adjacent angle range, and the optimized angle by the angle determination model, a self-learning capability of the machine learning model may be utilized to find a rule from a great amount of historical data, and to obtain a correlation between the similar projection image sequence and the optimized angle, as well as the correlation between the optimized angle and the first angle, thereby improving the accuracy and efficiency of determining the first angle and the optimized angle.

In some embodiments, the processing device 120 may also determine the optimized angle based on other preset computational relationships, which is not limited in the present disclosure.

In some embodiments, the processing device 120 may obtain at least one first optimized imaging angle based on the optimized angle. In some embodiments, the processing device 120 may determine the at least one first optimized imaging angle based on the optimized angle difference and the optimized angle range. For example, the processing device 120 may take an angle corresponding to one of range boundaries of the optimized angle range as the initial imaging angle, and then determine the at least one first optimized imaging angle based on the optimized angle difference.

In some embodiments, the processing device 120 may re-perform the scanning based on the at least one first optimized imaging angle to obtain a plurality of optimized projection images.

In some embodiments, the processing device 120 may match, among the plurality of optimized projection images, an optimized projection image that satisfies the first preset condition as the reference projection image, and take the angle corresponding to the reference projection image as the first angle. For more contents on matching the first preset condition, please refer to the related descriptions above. In some embodiments, in response to that none of the plurality of projection images satisfy the first preset condition, the processing device 120 may determine the optimized angle for scanning again and match the first preset condition again until the reference projection image is determined.

In some embodiments of the present disclosure, in response to that none of the plurality of projection images satisfy the first preset condition, the optimized angle for scanning may be determined based on the similar projection image, and the reference projection image may be determined among the optimized projection images. In this way, in the case of none of the plurality of projection images satisfy the first preset condition, a suitable angle for scanning may be determined again timely and efficiently, thereby improving an efficiency of obtaining the reference projection image and the first angle.

In some embodiments, in response to that none of the plurality of projection images satisfy the preset feature (i.e., the similar projection images are not available), the processing device 120 may again control the imaging device to re-scan the preset angle range and obtain the plurality of projection images again. In some embodiments, in response to that none of the plurality of projection images satisfy the preset feature (i.e., the similar projection images are not available), the user may make manual adjustments and make the processing device 120 control the imaging device again to scan the preset angle range to obtain the plurality of projection images again. The user's manual adjustments may include, but are not limited to, re-positioning the markers in the geometric model, adjusting the preset angle range, etc.

In some embodiments of the present disclosure, in response to that none of the plurality of projection images satisfy the preset feature, by re-performing the scanning or manually adjusting the scanning and then re-performing the scanning, a timely and effective adjustment is made to improve subsequent tracking of the marker accuracy, thereby improving the accuracy of the correction process.

FIG. 5 is a flowchart illustrating an exemplary process of tracking a projection marker based on correlations between projection images according to some embodiments of the present disclosure. In some embodiments, a process 500 may be performed by the processing device 120 or the system for geometric correction based on image tracking 200. For example, the process 500 may be stored in a storage device (e.g., the storage device 140, a storage unit of the processing device 120) in a form of a program or an instruction, and when the processor or the module shown in FIG. 2 executes the program or the instruction, the process 300 may be implemented. In some embodiments, the process 500 may be accomplished utilizing one or more of the additional operations not described below, and/or not by one or more of the operations discussed below. Additionally, an order of the operations as shown in FIG. 5 is not limiting. As shown in FIG. 5, the process 500 may include the following operations.

In 510, a first projection marker as well as a first correspondence between the original marker in the geometric model and the first projection marker in the first projection image may be determined based on a first projection image of the plurality of projection images.

The first projection image refers to the one of the plurality of projection images used for tracking. It should be noted that the plurality of projection images herein may include a plurality of optimized projection images. For more contents on optimizing the projection image, please refer to FIG. 4 and the related descriptions.

In some embodiments, the first projection image used for each round of tracking may be different. In some embodiments, the processing device 120 may randomly determine the first projection image for the first round of tracking among the plurality of projection images. For example, the processing device 120 may use the first projection image of the plurality of projection images as the first projection image for the first round of tracking. In some embodiments, the processing device 120 may use the reference projection image as the first projection image for the first round of tracking. For subsequent rounds of tracking, the first projection image may be the projection image tracked in a previous round.

The first projection marker refers to the projection marker corresponding to the first projection image.

In some embodiments, the processing device 120 may identify all of the projection markers in the first projection image as the first projection marker. In some embodiments, the processing device 120 may identify a specific projection marker in the first projection image as the first projection marker. In some embodiments, the processing device 120 may identify the projection markers other than the specific projection marker in the first projection image as the first projection marker. For more descriptions on the specific projection marker, please refer to FIG. 4.

The first correspondence refers to a correspondence between the original marker and the first projection marker in the first projection image. For more contents about the correspondence, please refer to FIG. 2 and the related descriptions.

In some embodiments, the processing device 120 may determine the first correspondence between the original marker and the first projection marker in the first projection image in various ways. For more descriptions on the way of determining the initial correspondence, please refer to FIG. 3, which are not repeated herein.

In 520, a second projection marker may be determined based on a second projection image of the plurality of projection images.

The second projection image refers to the projection image that needs to be used for marker tracking based on the first projection image. It may be noted that the projection image here may be an optimized projection image.

In some embodiments, the processing device 120 may use a certain number of projection images scanned after the first projection image as the second projection images. In some embodiments, the processing device 120 may use all of the projection images scanned after the first projection image as the second projection images.

In some embodiments, the second projection image is generated in the adjacent scans of the first projection image. In some embodiments, the processing device 120 may determine the projection images scanned adjacent to the first projection image as the second projection image.

The second projection marker refers to the projection marker corresponding to the second projection image.

In some embodiments, the processing device 120 may determine all of the projection markers in the second projection image as the second projection marker. In some embodiments, the processing device 120 may determine a specific projection marker in the second projection image as the second projection marker. In some embodiments, the processing device 120 may determine projection markers other than the specific projection marker in the second projection image as the second projection marker. For more descriptions of the specific projection marker, please refer to FIG. 4.

In 530, a mapping relationship between the second projection marker and the first projection marker may be determined based on a position relationship between the second projection marker and the first projection marker.

The position relationship refers to the position relationship between the second projection marker and the first projection marker in a projection coordinate. For example, the position relationship may be a coincident, an outlying, an intersecting, etc. In some embodiments, the processing device 120 may determine the position relationship between the second projection marker and the first projection marker by formula calculation, obtaining user input, machine learning model calculation, and other modes. The relevant examples of the aforementioned modes for determining the position relationship are for illustration only, and are not intended to limit the scope of the present disclosure.

In some embodiments, the position relationship may include a coordinate distance between the second projection marker and the first projection marker. The coordinate distance refers to a distance between the projection coordinates of the two types of markers. For example, the coordinate distance may be an absolute value of a projection coordinate difference.

In some embodiments, the processing device 120 may determine the coordinate distance between the second projection marker and the first projection marker by a coordinate distance formula. In some embodiments, the processing device 120 may also determine the coordinate distance between the second projection marker and the first projection marker by any feasible way such as a distance algorithm, a machine learning model, etc., which is not limited in the present disclosure.

In some embodiments of the present disclosure, by setting the position relationship including the coordinate distance between the second projection marker and the first projection marker, it may convenient to subsequently determine the correspondence between the two types of markers based on the coordinate distance.

The mapping relation refers to a one-to-one correspondence between the second projection marker and the first projection marker. In some embodiments, the mapping relationship may be that the second projection marker and the first projection marker are projections of the same original marker. In some embodiments, the mapping relationship may include the coordinate distance between the second projection marker and the first projection marker.

In some embodiments, the processing device 120 may determine a mapping relationship between the second projection marker and the first projection marker based on the coordinate distance between the second projection marker and the first projection marker. In some embodiments, the processing device 120 may obtain the projection coordinates of each of the first projection markers in the first projection image and the coordinates of each of the second projection markers in the second projection image. For each of the first projection markers, when the absolute value of the coordinate difference between a second projection marker in the second projection image and the first projection marker is the smallest, it may be determined that the second projection marker and the first projection marker are the projections of the same original marker.

Figure 8:
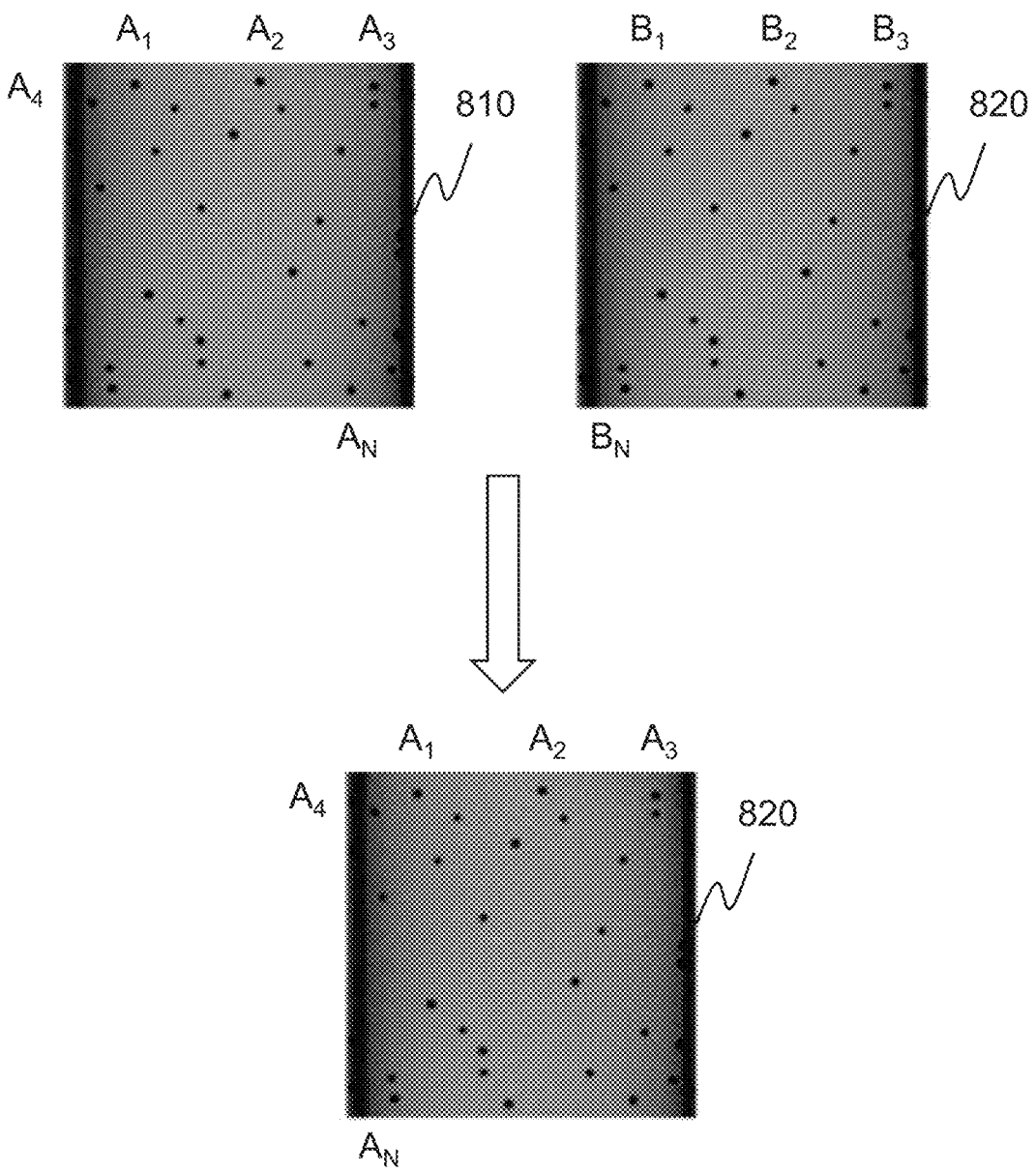
FIG. 8 is a schematic diagram illustrating an exemplary method for geometric correction based on image tracking according to some embodiments of the present disclosure.

As an example only, as shown in FIG. 8, the processing device 120 may obtain the projection coordinates of each of the first projection markers (A1, A2, A3, A4, . . . , AN) in a first projection image 810 and each of the second projection markers (B1, B2, B3, B4, . . . , BN) in a second projection image 820. Taking A1 as an example, if the absolute value of the coordinate difference between one of the second projection markers (e.g., B2) in B1, B2, B3, . . . BN and A1 is the smallest, then B2 and A1 may be determined as projections of the same original marker.

In some embodiments, the processing device 120 may track, based on the first projection image, the second projection markers in all the second projection images by the above-described method, thereby obtaining a tracking result. For example, the processing device 120 may track, based on a first frame of projection image (at this time, the first frame of projection image may be used as the first projection image) and a second frame of projection image of the adjacent angle (at this time, the second frame of projection image may be used as the second projection image), the second projection marker in the second frame of projection image; track, based on the second frame of projection image (at this time, the second frame of projection image may be used as the first projection image) and a third frame of projection image of the adjacent angle (at this time, the third frame of projection image may be used as the second projection image), the second projection marker in the third frame of projection image; . . . ; track, based on a 99th frame of projection image (at this time, the 99th frame of projection image may be used as the first projection image) and a 100th frame of projection image of the adjacent angle (at this time, the 100th frame of projection image may be used as the second projection image), the second projection marker in the 100th frame of projection image. The foregoing examples related to determining the mapping relationship are for illustrative use only and are not intended to limit the scope of the present disclosure.

In some embodiments of the present disclosure, the mapping relation between the second projected marker in the second projected image and the first projection marker in the first projected image may be determined through the position relation between the second projected marker in the second projected image and the first projection marker in the first projected image, so as to make the tracking process reasonable and reliable, and to establish an accurate mapping relationship between the first projection marker and the second projection marker, thereby facilitating the subsequent geometric correction.

In 540, the target correspondence between the original markers in the geometric model and the projection markers in the tracked projection image may be determined based on the first correspondence and the mapping relationship between the second projection marker and the first projection marker.

In some embodiments, the processing device 120 may determine the correspondence between the second projection marker and the original marker based on the first correspondence between the original marker and the first projection marker, and the mapping relationship between the first projection marker and the second projection marker; and then obtain the correspondence between a original marker and the projection markers, and finally obtain the target correspondence between the original markers and the projection markers.

In some embodiments, in response to not being able to track a third number of projection markers and/or the second projection images, the processing device 120 may re-scan within a target angle range of the untracked projection markers and/or the second projection images, and track based on the rescanning results.

The third number refers to a number of untraceable markers or the number of the second projection images. In some embodiments, the third number may be less than or equal to a second number threshold. The second number threshold may be preset based on the experience or the demand.

It may be understood that, when the tracking is performed by the foregoing tracking mode, there may be a case in which the mapping relationship between the second projection marker and the first projection marker cannot be determined (e.g., there may be a case in which a plurality of the second projection markers are at the same distance from the first projection marker etc.), i.e., the tracking may not be performed.

The target angle range refers to the range of imaging angle corresponding to the untraceable plurality of projection images. The target angle range corresponding to the untraceable plurality of projection images may also be referred to as a to be processed projection image sequence.

In some embodiments, for the second projection marker in the second projection image that cannot be tracked, the processing device 120 may measure, one by one, the correspondence between the second projection marker and the original marker, and then determine, based on the initial correspondence of the first projection marker and the original marker, the mapping relationship between the first projection marker and the second projection marker. For more descriptions on measuring the correspondence, please refer to FIG. 3 and the related descriptions.

In some embodiments, the mapping relationship between the untraceable second projection marker and the first projection marker may also be obtained by manual labeling.

In some embodiments, the processing device 120 may re-scan based on the first angle difference within the target angle range, obtain a plurality of replacement projection images, and re-track based on the re-scanning results (i.e., the plurality of replacement projection images). In some embodiments, the processing device 120 may determine an angle of one of the range boundaries based on the target angle range as the initial imaging angle, then determine at least one second optimized imaging angle through the first angle, and re-scan based on the second optimized imaging angle to obtain the plurality of replacement projection images.

In some embodiments, the processing device 120 may determine the first angle difference in various ways. In some embodiments, the processing device 120 may determine the first angle difference by reducing the angle difference. For example, the processing device 120 may determine the first angle difference by decreasing the first angle difference by a certain angle from the initial angle difference. For another example, the processing device 120 may determine the first angle difference by decreasing a certain angle difference by a certain angle from the optimized angle difference. The first angle difference may be determined in a way similar to the way in which the optimized angle difference is determined. For more descriptions, please refer to FIG. 4 and the related descriptions.

It may be understood that, the re-scanning and the re-tracking based on a smaller angle difference may facilitate the subsequent tracking to make the distance between the first projection marker and the second projection marker smaller, which is more helpful in determining the mapping relationship.

In some embodiments, in response to not being able to track a fourth number of projection markers and/or the second projection images, the processing device 120 may determine a boundary angle range, re-scan within the boundary angle range, and track based on a re-scan result.

The fourth number refers to the number of untraceable markers or the number of second projection images. In some embodiments, the fourth number may be greater than the second number threshold.

The boundary angle range refers to a range of imaging angles between the projection marker and/or the second projection image can be tracked and the projection marker and/or the second projection image cannot be tracked. For example, when the target angle range is 40 degrees to 60 degrees, the boundary angle range may be 38 degrees to 42 degrees, 58 degrees to 62 degrees, etc.

In some embodiments, the processing device 120 may determine the boundary angle range in various ways. In some embodiments, the processing device 120 may determine the boundary angle range by obtaining the user input. In some embodiments, the processing device 120 may determine the boundary angle range based on the target angle range by a second data comparison table. The second data comparison table may include different target angle ranges and their corresponding boundary angle ranges, and the second data comparison table may be determined based on the historical data or the empirical presets.

In some embodiments, the processing device 120 may determine the boundary angle range based on a range determination model.

In some embodiments, the range determination model may be a machine learning model, such as, for example, a Long Short-Term Memory (LSTM) model, a Neural Network (NN) model, etc.

In some embodiments, an input of the range determination model may be a target angle range and a corresponding to be processed projection image sequence and/or an absolute value sequence corresponding to the to be processed projection image sequence, and an output may be the boundary angle range. The absolute value sequence corresponding to the to be processed projection image sequence may include absolute values of coordinate differences between the projection markers and the original markers in each projection image included in the to be processed projection image sequence.

In some embodiments, the range determination model may be obtained by training a plurality of second training samples with second labels. In some embodiments, the second training samples may include a sample to be processed projection image sequence and/or a sample coordinate difference absolute value sequence corresponding to a sample target angle range, and the second labels may include a sample boundary angle range corresponding to the sample target angle range. A training process of the range determination model may be similar to the training process of the angle determination model. For more descriptions, please refer to FIG. 4, which are not repeated here.

In some embodiments of the present disclosure, determining the boundary angle range by the range determination model may utilize a self-learning capability of the machine learning model to find a law from a great amount of historical data to obtain the target angle range and the correlation relationship between the corresponding projection image sequence and the boundary angle range, thereby improving an accuracy and efficiency of determining the boundary angle range.

In some embodiments, the processing device 120 may re-perform the scanning based on the second angle difference within the boundary angle range to obtain a plurality of calibration projection images. In some embodiments, the processing device 120 may determine at least one third optimized imaging angle based on an angle corresponding to one of the range boundaries of the boundary angle range as the initial imaging angle, then determine at least one third optimized imaging angle based on the second angle difference, and re-perform the scanning based on the third optimized imaging angle to obtain the plurality of calibration projection images.

In some embodiments, the processing device 120 may determine the second angle difference in various ways. In some embodiments, the processing device 120 may determine the second angle difference by decreasing the angle difference. The second angle difference may be determined in a way similar to the way in which the first angle difference is determined, more descriptions may be referred to in related descriptions above.

In some embodiments, the processing device 120 may determine whether the projection markers of the plurality of calibration projection images and/or the plurality of calibration projection images can be tracked; in response to that the projection markers of the plurality of calibration projection images and/or the plurality of calibration projection images can be tracked, the processing device 120 may determine a remaining angle range based on the boundary angle range; and, the processing device 120 may reperform the tracking based on the remaining angle range and the second angle difference, in response to a presence of the projection marker of the calibration projection image and/or the calibration projection image cannot be tracked, the processing device 120 may determining that there is an anomaly in the reference projection image and/or the first angle, and may re-determining the reference projection image and/or the first angle. The remaining angle range refers to an entire angle range excluding the boundary angle range. For more descriptions on tracking, please refer to FIG. 4 and the related descriptions.

In some embodiments of the present disclosure, in a particular case of not being able to track the third number of projection markers and/or the second projection image (at this time there may be individual markers and individual images or angles that cannot be tracked) and in a particular case of not being able to track the fourth number of projection markers and/or a second projection image (at this time, there may be a lot of markers and a lot of images or angles that cannot be tracked), by re-determining the angle difference, re-scanning (at this time, the absolute value of the coordinate difference may be smaller) and re-tracking, and respectively adopting modes more suitable for the re-scanning and tracking, the coordinate distance between the first projection marker and the second projection marker may be smaller in subsequent tracking, so as to facilitate the determination of the mapping relationship and to perform tracking on the projection marker.

Figure 6:
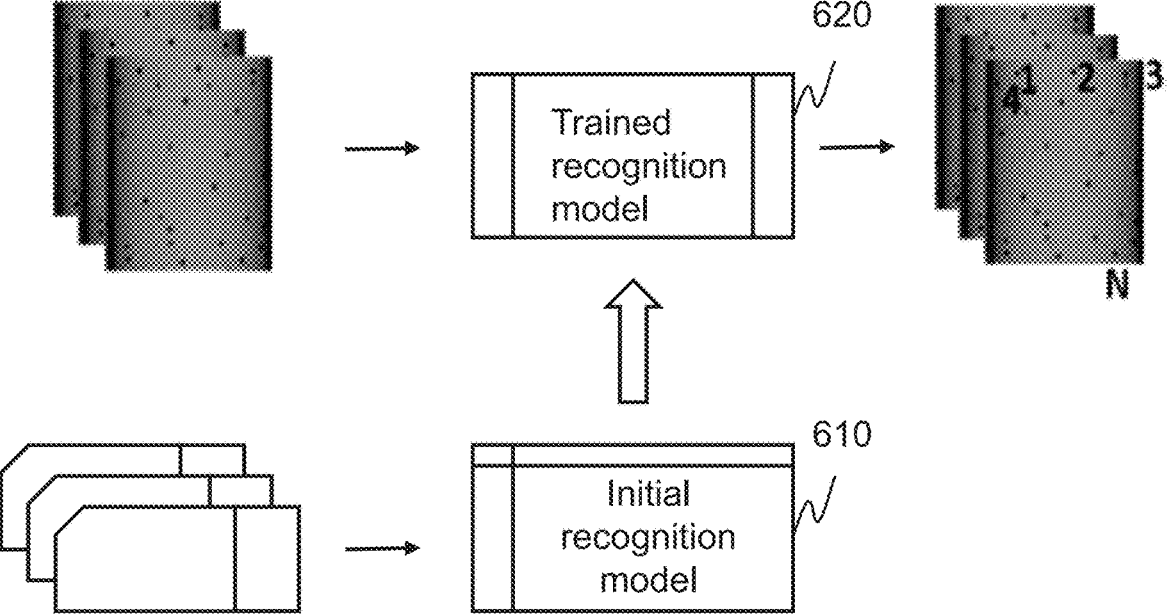
FIG. 6 is a schematic diagram illustrating an exemplary recognition model and a training of the recognition model according to some embodiments of the present disclosure.

FIG. 6 is a schematic diagram illustrating an exemplary recognition model and a training of the recognition model according to some embodiments of the present disclosure.

In some embodiments, the processing device 120 may adopt a recognition model to track the projection marker.

The recognition model may be a model used to perform a projection marker tracking. In some embodiments, the recognition model may be a machine learning model, and the machine learning model may include, but not limited to, one or more of a neural network model, a support vector machine model, a k-nearest neighbor model, a decision tree model, etc. The neural network model may include one or more of a convolutional neural network (CNN), a LeNet, a GoogLeNeT, an ImageNet, an AlexNet, a VGG, a ResNet, etc.

As shown in FIG. 6, in some embodiments, an input to the recognition model may include adjacently scanned projection images; and an output of the recognition model may include mapping relationship of the projection markers in the adjacently scanned projection images.

In some embodiments, the output of the recognition model may further include a confidence degree of the correspondence. The confidence degree of the correspondence refers to a parameter used to assess an accuracy of the correspondence.

As shown in FIG. 6, in some embodiments, an initial recognition model 610 may be trained based on a great number of third training samples with third labels to update parameters of the initial recognition model to obtain a trained recognition model 620.

In some embodiments, the processing device may obtain a plurality of third training samples, each of the third training samples including adjacently scanned sample projection images, and the third labels may include mapping relationships of the projection markers in the adjacently scanned sample projection images, and the confidence degrees thereof.

In some embodiments, the third label may be obtained by manually or automatically processing the sample projection images adjacently scanned. The third label may be added manually or automatically, or may be added by other means, which are not limited by this embodiment.

In some embodiments, the processing device may obtain a plurality of third training samples, including their corresponding third labels, by reading from a database, a storage device, or calling a data interface.

In some embodiments, the processing device may process the adjacently scanned sample projection images by the recognition model to obtain a prediction mapping relationship of the projection markers in the adjacently scanned sample projection images.

In some embodiments, the processing device may construct a loss function based on the prediction correspondence and the third label, update the initial recognition model based on the loss function, and obtain a trained recognition model. The loss function may reflect a magnitude of a difference between the prediction correspondence and the third label. The processing device may adjust the parameters of the recognition model based on the loss function to reduce the difference between the prediction correspondence and the label. For example, by continually adjusting the parameters of the recognition model, a value of the loss function may be made to decrease or minimize.

In some embodiments, the recognition model may also be obtained based on other training modes, such as setting a corresponding initial learning rate (e.g., 0.1), and a learning rate decay strategy for the recognition model, and based on the third training sample with the third label, the recognition model may be obtained by training to obtain the recognition model. The present disclosure makes no limit here.

It should be noted that the foregoing descriptions of the processes 300, 500 are for the purpose of illustration and description only and do not limit the scope of application of the present disclosure. For those skilled in the art, various corrections and changes may be made to the processes 300, 500 under the guidance of the present disclosure. However, these corrections and changes remain within the scope of the present disclosure. In some embodiments, the model generation process, and the geometry correction processing (e.g., tracking of markers, geometry correction, etc., depicted in FIG. 3) described in FIG. 6 may be performed on different processing devices. For example, the model generation process described in FIG. 6 may be performed on the processing device of a manufacturer of an imaging device, while a portion or all of the geometric correction processing may be performed on the processing device of a user of the imaging device (e.g., a hospital, etc.).

In some embodiments of the present disclosure, by adopting the recognition model for tracking the projection markers, the tracking process of the projection markers may be intelligently handled, and by comprehensively analyzing the similar projection images and the feature relations between them through the machine learning model, the mapping relationships between the projection markers may be determined efficiently and accurately.

FIG. 9 is a flowchart illustrating an exemplary method for geometric correction based on image tracking according to some other embodiments of the present disclosure. In some embodiments, a process 900 may be performed by the processing device 120 or the system for geometric correction based on image tracking 200. For example, the process 900 may be stored in a storage device (e.g., the storage device 140, a storage unit of the processing device 120) in the form of a program or an instruction, and when the processor or the module shown in FIG. 2 executes the program or the instruction, the process 900 may be implemented. In some embodiments, the process 900 may be accomplished utilizing one or more of additional operations not described below, and/or not by one or more of the operations discussed below. Additionally, the order of operations shown in FIG. 9 is not limiting.

In 910, a plurality of projection images of a geometric model may be obtained, each of the plurality of projection images including a projection marker corresponding to an original marker in the geometric model, the plurality of projection images including a first projection image of a first angle. In some embodiments, operation 910 may be performed by the processing device 120 or the first obtaining module 210.

For more descriptions on the geometric model and the projection image, please refer to FIG. 3 and the related descriptions.

In 920, an initial correspondence between the original markers in the geometric model and the projection markers in one of the plurality of projection images may be obtained. In some embodiments, operation 920 may be performed by the processing device 120 or the second obtaining module 220.

In some embodiments, first, the second obtaining module 220 may select a first projection image that satisfies an angle feature among the plurality of projection images by an automatic detection algorithm, and then take the angle corresponding to the first projection image as the first angle.

The automatic detection algorithm may be an algorithm that identify the first projection image by detecting known features. The known features may include, for example, an arrangement feature of the projection markers in the projection image.

In some embodiments, the automatic detection algorithm may take the projection image in the plurality of projection images whose arrangement feature of the projection markers is the same or most similar to a preset arrangement feature as the first projection image. The preset arrangement feature may be preset based on experience or demands, for example, the arrangement features of all the projection markers when a certain projection marker is located at a centerline of the projection image may be taken as the preset arrangement feature.

In some embodiments, the geometric model may also include a great marker, and the known features may also include a projection feature of the great marker (e.g., the coordinates of the center of the great marker). The automatic detection algorithm may use the projection image in the plurality of projection images whose projection feature of the great marker is the same or most similar to a preset great marker projection feature as the first projection image. The preset great marker projection feature may be preset based on the experience or the demands, for example, the preset great marker projection feature may be that the projection coordinates of the center of the great marker in the projection image is (17, 19).

In some embodiments, the projection coordinates are pixel-based 2D coordinates with an origin at an upper-left corner of the projection image (the first projection image and/or the second projection image) in pixels.

The prior art generally first manually places the geometric model at a first angle, and then subsequently scanning the first projection image, which requires a high accuracy of the manual placement. By first scanning a plurality of projection images, then automatically recognizing the first projection image and/or the first angle, embodiments of the present disclosure help to reduce a manual involvement and improve the accuracy and efficiency.

Secondly, the second obtaining module 220 may automatically recognize the initial correspondence between each first marker in the first projection image and each original marker in the geometric model. In some embodiments, this initial correspondence may be obtained from the storage device 140, the storage unit of the processing device 120, etc. In some embodiments, the second obtaining module 220 may obtain the correspondence by reading from a storage device and a database, calling a data interface, etc.

In some embodiments, the second obtaining module 220 may obtain the initial correspondence between each first projection marker in the first projection image and each original marker by other modes. For example, by an expert correction mode. For another example, by training a machine learning model.

In 930, a tracking result may be obtained by tracking the projection markers based on a similarity between the projection images of adjacent angles. In some embodiments, operation 930 may be performed by the processing device 120 or the first determination module 230.

The similarity between the projection images of the adjacent angles refers to a similar or an approximate property of the projection images of the adjacent angles resemble or are similar. For example, the center coordinates of each of the projection markers in the projection images of the adjacent angles are closer, the projection markers are similarly arranged in the projection images of the adjacent angles, etc.

The tracking result may be a result that reflects a change in the projection marker between the projection images. For example, the tracking result may include a position change, a moving track, a logo, etc. of the projection marker.

In some embodiments, the first determination module 230 may track the projection marker in various ways to obtain the tracking result.

In some embodiments, the first determination module 230 may track the projection marker based on the projection coordinates of the projection marker. For more descriptions on tracking the projection marker, please refer to FIGS. 3, 6, and 8.

In 940, a target correspondence between the original markers and the projection markers may be obtained based on the tracking result. In some embodiments, operation 940 may be performed by the processing device 120 or the corresponding second determination module 240.

The target correspondence between each original marker and each projection marker refers to the correspondence between the model coordinates and the projection coordinates of each marker in the geometric model and the projection image from each angle. Determining the target correspondence may be an important operation in a calculation of the geometric correction.

In some embodiments, the second determination module 240 may determine the target correspondence based on the tracking result. For example, the processing device 120 may determine, based on the original marker and the projection markers of the original marker obtained by the tracking in each of the projection images, a relationship between the model coordinates of the original marker and the projection coordinates of the projection markers in each of the projection images.

In 950, a geometric correction may be performed based on the target correspondence. In some embodiments, operation 950 may be performed by the processing device 120 or the geometric correction module 240.

The geometric correction refers to a process of eliminating or correcting geometric errors. Geometric artifacts in reconstruction images caused by geometric errors may be eliminated or reduced by geometric correction.

In some embodiments, the geometric correction module 240 may perform the geometric correction based on the correspondences through modes such as a two-metal marker geometric correction, an iterative geometric correction, etc.

It should be noted that the foregoing description of the process 900 is intended to be exemplary and illustrative only and does not limit the scope of application of the present disclosure. For a person skilled in the art, various corrections and changes may be made to the process 900 under the guidance of the present disclosure. However, these corrections and changes remain within the scope of the present disclosure.

Some embodiments of the present disclosure have at least the following technical effects: (1) by utilizing the relationship between projections of adjacent imaging angles to track the projection markers, the tracking can be more accurate; (2) by automatically selecting a reference and/or an initial projection image to determine the initial correspondence, manual involvement can be reduced or avoided, and the accuracy and efficiency of the correction work are improved.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the disclosure uses specific words to describe embodiments of the disclosure. such as "an embodiment", "one embodiment", and/or "some embodiment" means a feature, structure, or characteristic associated with at least one embodiment of the present disclosure. Accordingly, it should be emphasized and noted that "one embodiment" or "an embodiment" or "an alternative embodiment" in different places in the present disclosure do not necessarily refer to the same embodiment. In addition, certain features, structures, or characteristics in one or more embodiments of the present disclosure may be suitably combined.

Furthermore, unless expressly stated in the claims, the order of the processing elements and sequences, the use of numerical letters, or the use of other names as described in the present disclosure are not intended to limit the order of the processes and modes of the present disclosure. While some embodiments of the present disclosure that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the present disclosure, the foregoing descriptions of embodiments of the present disclosure sometimes group multiple features together in a single embodiment, an accompanying drawing, or a description thereof. However, this method of disclosure does not imply that the objects of the present disclosure require more features than those mentioned in the claims. Rather, claimed subject matter may lie in less than all features of a single foregoing disclosed embodiment.

Numbers describing the quantity of components and attributes are used in some embodiments, and it should be understood that such numbers used in the description of embodiments are modified in some examples by the modifiers "about", "approximately", or "substantially". ", "approximately", or "generally" is used in some embodiments. Unless otherwise noted, the terms "about," "approximately," or "roughly" indicates that a ±20% variation in the stated number is allowed. Correspondingly, in some embodiments, the numerical parameters used in the disclosure and claims are approximations, which subject to change depending on the desired characteristics of individual embodiments. In some embodiments, the numerical parameters should take into account the specified number of valid digits and employ general method of digit reservation. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, disclosure sheets, publications, documents, etc., the entire contents of which are hereby incorporated herein by reference. Except for application history documents that are inconsistent with or create a conflict with the contents of the present disclosure, and except for documents that limit the broadest scope of the claims of the present disclosure (currently or hereafter appended to the present disclosure). It should be noted that in the event of any inconsistency or conflict between the descriptions, definitions, and/or use of terminology in the materials appended to the present disclosure and those set forth in the present disclosure, the descriptions, definitions and/or use of terms in the present disclosure shall prevail.

Finally, it should be understood that the embodiments described in the present disclosure are used only to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A system for geometric correction based on image tracking, comprising:

at least one storage device including a set of instructions; and at least one processor in communication with the at least one storage device, wherein when executing the set of instructions, the at least one processor is directed to perform operations including:

obtaining a plurality of projection images of a geometric model, each of the plurality of projection images including a projection marker corresponding to an original marker in the geometric model, wherein one of the plurality of projection images corresponding to one of the plurality of imaging angles;

obtaining an initial correspondence between the original markers in the geometric model and the projection markers in one of the plurality of projection images;

determining a target correspondence between the original markers in the geometric model and the projection markers in the tracked projection image by tracking, based on the initial correspondence and a correlation of the plurality of projection images, the projection markers in the plurality of projection images; and performing, based on the target correspondence, a geometric correction.

2. The system of claim 1, wherein obtaining the plurality of projection images of the geometric model includes:

obtaining a imaging parameter of the geometric model; and generating the plurality of projection images of the geometric model, based on the imaging parameter.

3. The system of claim 2, further comprising:

determining, based on the imaging parameter, an angle difference of at least one group of adjacent scans; and determining, based on the angle difference, at least one of the plurality of imaging angles.

4. The system of claim 1, wherein obtaining an initial correspondence between the original markers in the geometric model and the projection markers in one of the plurality of projection images includes:

determining the projection image satisfying a first preset condition as a reference projection image; and obtaining the initial correspondence between the original markers in the geometric model and the projection markers in the reference projection image.

5. The system of claim 4, further comprising:

in response to determining that none of the plurality of projection images satisfy the first preset condition, extracting an similar projection image satisfying a second preset condition;

determining, based on the similar projection image, an optimized angle; and generating an optimized projection image by scanning, based on the optimized angle, the geometric model; and determining the optimized projection image satisfying the first preset condition as the reference projection image.

6. The system of claim 5, wherein the optimized angle is determined based on a deviation degree, the deviation degree being a deviation value between a position of the projection marker in the one of the plurality of projection images and a preset position corresponding to the first preset condition.

7. The system of claim 4, wherein obtaining the initial correspondence between the original markers in the geometric model and the projection markers in the one of the plurality of projection images includes:

selecting, from the plurality of projection images by an automatic detection algorithm, the reference projection image that satisfies the preset feature; and automatically recognizing the initial correspondence between the projection markers in the reference projection image and the original markers.

8. The system of claim 1, wherein determining a target correspondence between the original markers in the geometric model and the projection markers in the tracked projection image by tracking, based on the initial correspondence and a correlation of the plurality of projection images, the projection markers in the plurality of projection images includes:

determining, based on a first projection image of the plurality of projection images, a first projection marker;

determining a first correspondence between the original marker in the geometric model and the first projection marker in the first projection image;

determining, based on a second projection image of the plurality of projection images, a second projection marker; and determining, based on a position relationship between the second projection marker and the first projection marker, a mapping relationship between the second projection marker and the first projection marker; and determining the target correspondence between the original markers in the geometric model and the projection markers in the tracked projection image, based on the first correspondence and the mapping relationship between the second projection marker and the first projection marker.

9. The system of claim 8, wherein the second projection image is generated in the adjacent scans of the first projection image.

10. The system of claim 8, wherein the position relationship includes a distance between coordinates of the second projection marker and coordinates of the first projection marker.

11. The system of claim 10, wherein determining, based on the position relationship between the second projection marker and the first projection marker, the mapping relation between the second projection marker and the first projection marker includes:

in response to determining that an absolute value of a coordinate difference between a second projection marker in the second projection image and the first projection marker is the smallest, determining the second projection marker and the first projection marker as the same projection corresponding to the original marker.

12. The system of claim 1, wherein determining a target correspondence between the original markers in the geometric model and the projection markers in the tracked projection image by tracking, based on the initial correspondence and a correlation of the plurality of projection images, the projection markers in the plurality of projection images includes:

tracking the projection markers in the plurality of projection images using a recognition model, the recognition model being a machine learning model.

13. The system of claim 12, wherein:

an input of the recognition model includes the projection images generated in adjacent scans; and an output of the recognition model includes mapping relationships of the projection markers in the projection images generated in the adjacent scans.

14. A method for geometric correction based on image tracking, method for geometric correction based on image tracking, implemented on a device including one or more processing devices and one or more storage devices, the method comprising:

obtaining a plurality of projection images of a geometric model, each of the plurality of projection images including a projection marker corresponding to an original marker in the geometric model, wherein the plurality of projection images corresponding to a plurality of imaging angles;

obtaining an initial correspondence between the original markers in the geometric model and the projection markers in one of the plurality of projection images;

determining a target correspondence between the original markers in the geometric model and the projection markers in the tracked projection image by tracking, based on the initial correspondence and a correlation of the plurality of projection images, the projection markers in the plurality of projection images; and performing, based on the target correspondence, a geometric correction.

15. The method of claim 14, wherein obtaining the plurality of projection images of the geometric model includes:

obtaining a imaging parameter of the geometric model; and generating the plurality of projection images of the geometric model by performing, based on the imaging parameter.

16. The method of claim 15, further comprising:

determining, based on the imaging parameter, an angle difference of at least one group of adjacent scans, and determining, based on the angle difference, at least one of the plurality of imaging angles.

17. The method of claim 14, wherein obtaining an initial correspondence between the original markers in the geometric model and the projection markers in one of the plurality of projection images includes:

determining the projection image satisfying a first preset condition as a reference projection image; and obtaining the initial correspondence between the original markers in the geometric model and the projection markers in the reference projection image.

18. The method of claim 17, wherein the at least one processor is directed to perform the operations including:

in response to determining that none of the plurality of projection images satisfy the first preset condition, extracting an similar projection image satisfying a second preset condition;

determining, based on the similar projection image, an optimized angle generating an optimized projection image by scanning, based on the optimized angle, the geometric model; and determining the optimized projection image satisfying the first preset condition as the reference projection image.

19. The method of claim 14, wherein determining the optimized projection image satisfying the first preset condition as the reference projection image by tracking, based on determining the optimized projection image satisfying the first preset condition as the reference projection image includes:

determining, based on a first projection image of the plurality of projection images, a first projection marker;

determining a first correspondence between the original marker in the geometric model and the first projection marker in the first projection image;

determining, based on a second projection image of the plurality of projection images, a second projection marker; and determining, based on a position relationship between the second projection marker and the first projection marker, a mapping relationship between the second projection marker and the first projection marker; and determining the target correspondence between the original markers in the geometric model and the projection markers in the tracked projection image, based on the first correspondence and the mapping relationship between the second projection marker and the first projection marker.

20. A non-transitory computer readable medium, comprising at least one set of instructions for geometric correction based on image tracking, wherein when executed by one or more processors of a computing device, the at least one set of instructions causes the computing device to perform a method, the method comprising:

obtaining a plurality of projection images of a geometric model, each of the plurality of projection images including a projection marker corresponding to an original marker in the geometric model, wherein the plurality of projection images corresponding to a plurality of imaging angles;

obtaining an initial correspondence between the original markers in the geometric model and the projection markers in one of the plurality of projection images;

determining a target correspondence between the original markers in the geometric model and the projection markers in the tracked projection image by tracking, based on a correlation of the plurality of projection images, the projection markers in the plurality of projection images; and performing, based on the target correspondence, a geometric correction.

*   *   *   *   *